United States Patent [19]
Graham

[11] 4,068,227
[45] Jan. 10, 1978

[54] CONTROL MEANS FOR AN OPTICAL BAR CODE SERIAL PRINTER

[75] Inventor: Richard E. Graham, Dayton, Ohio

[73] Assignee: NCR Corporation, Dayton, Ohio

[21] Appl. No.: 235,809

[22] Filed: Mar. 17, 1972

Related U.S. Application Data

[62] Division of Ser. No. 51,149, June 30, 1970, Pat. No. 3,678,465.

[51] Int. Cl.² .......................................... H03K 13/24
[52] U.S. Cl. .............................................. 340/347 DD
[58] Field of Search ............ 340/347 DD; 325/38 A; 101/93 C

[56] References Cited
U.S. PATENT DOCUMENTS

| | | | |
|---|---|---|---|
| 3,214,749 | 10/1965 | Karnaugh | 340/347 DD |
| 3,611,141 | 10/1971 | Waters | 340/347 DD |
| 3,634,855 | 1/1972 | Miller | 340/347 DD |
| 3,671,959 | 6/1972 | Amano | 340/347 DD |
| 3,713,138 | 1/1973 | Girard | 340/347 DD |

Primary Examiner—Charles D. Miller
Attorney, Agent, or Firm—J. T. Cavender; Wilbert Hawk, Jr.; Jonn J. Callahan

[57] ABSTRACT

Control logic circuitry for a printing apparatus which records data according to a predetermined color bar code on a moving record medium. The apparatus includes first and second recording stations and a feed mechanism for successively feeding the record medium thereto in equal increments, so as to provide equally-spaced recording locations on the record medium. First and second indicia (parallel bars printed in first and second colors) are recorded on the record medium at the appropriate recording locations in conformity with the code. The surface of the record medium is used for a third indicium, which likewise is recorded thereon in the form of a parallel bar. Data to be recorded on the record medium is entered through a keyboard and converted by the logic into a bar code which is fed to logic circuitry which controls printing apparatus at the first and second recording stations and the record medium feed mechanism, thereby determining the color printed on the recording medium.

The code used is of the transition type, which utilizes three different indicia. Each succeeding indicium printed on the record medium is always different from the adjacent indicium, thus eliminating the need for a separate clocking pulse on the record medium.

6 Claims, 16 Drawing Figures

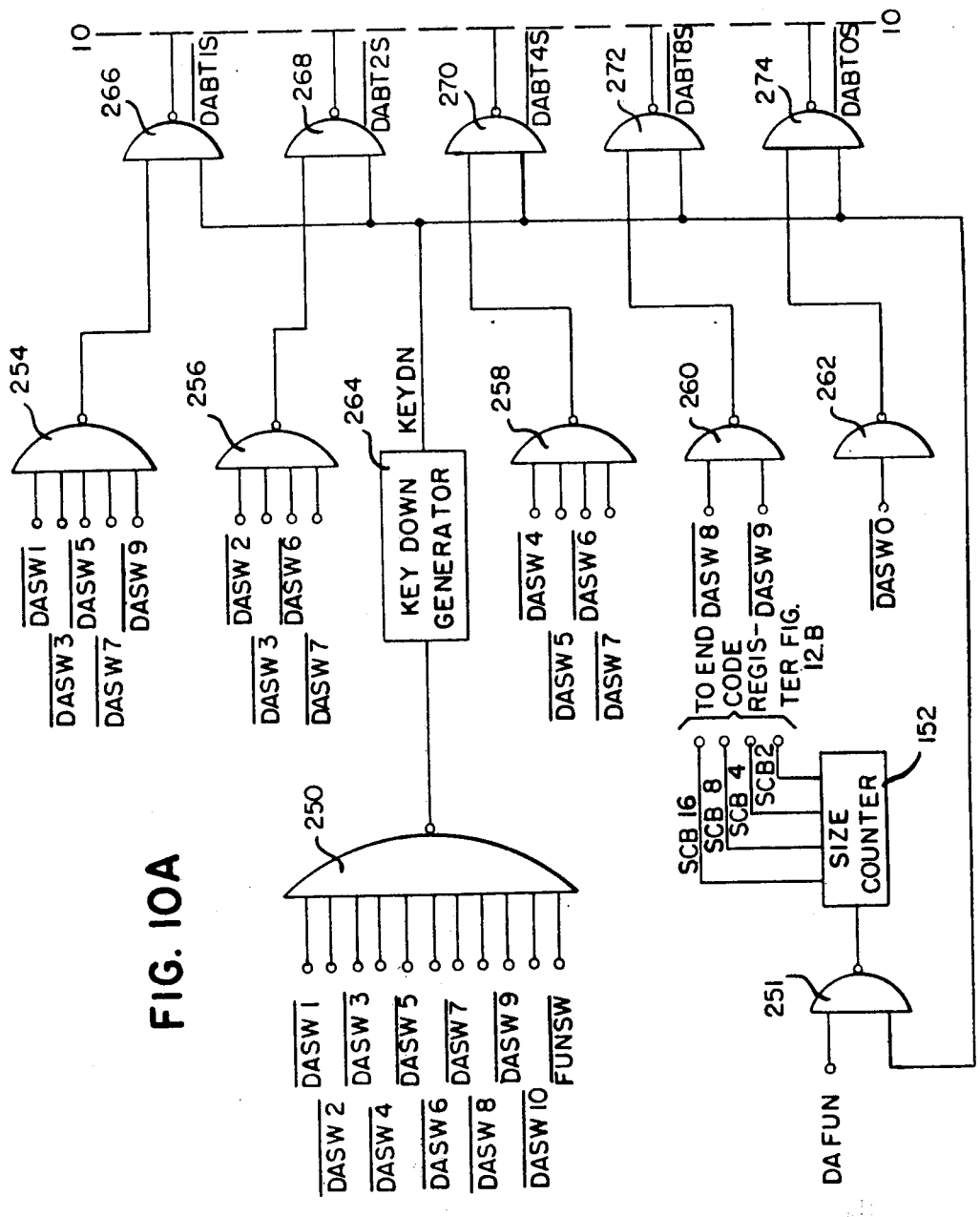

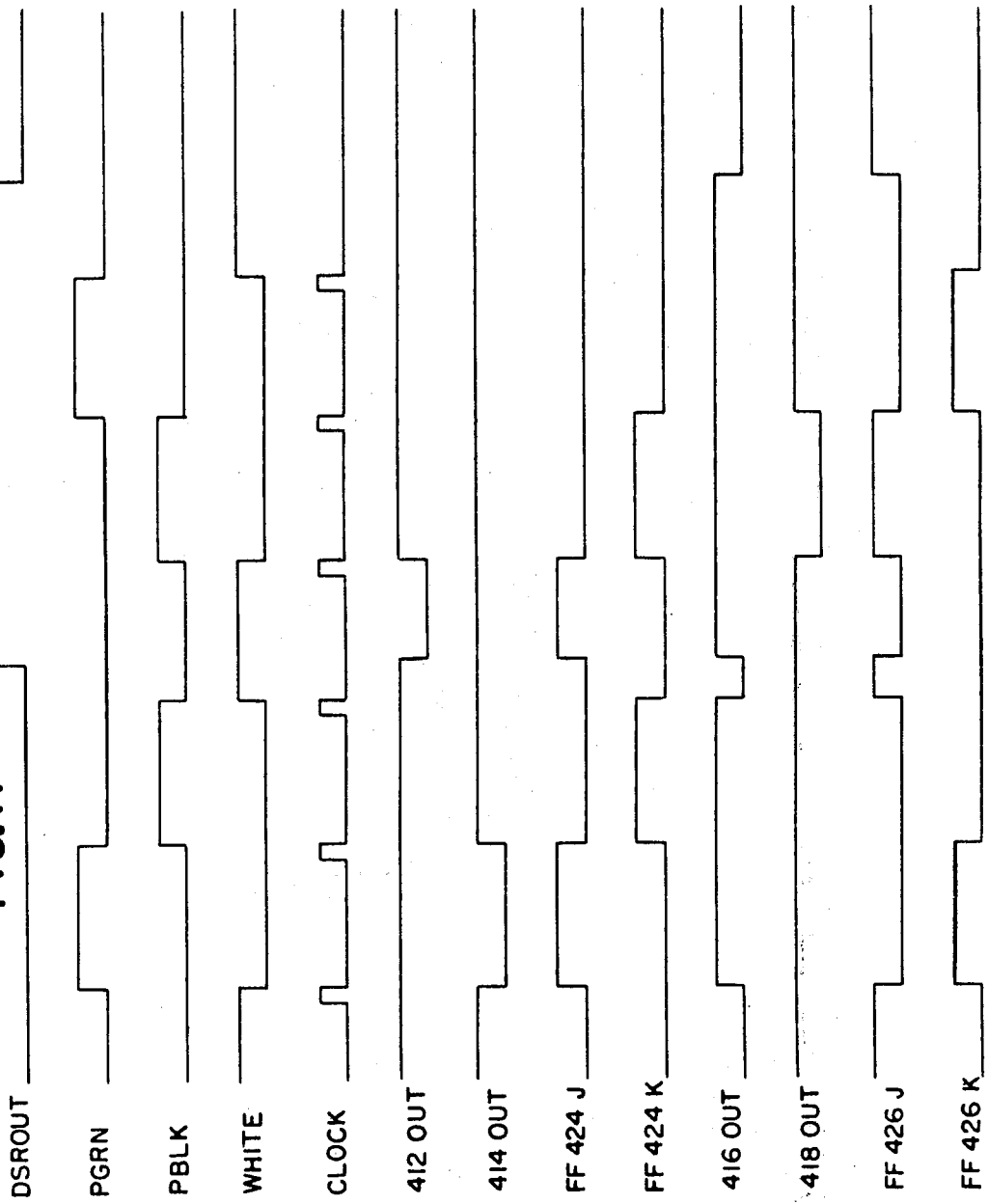

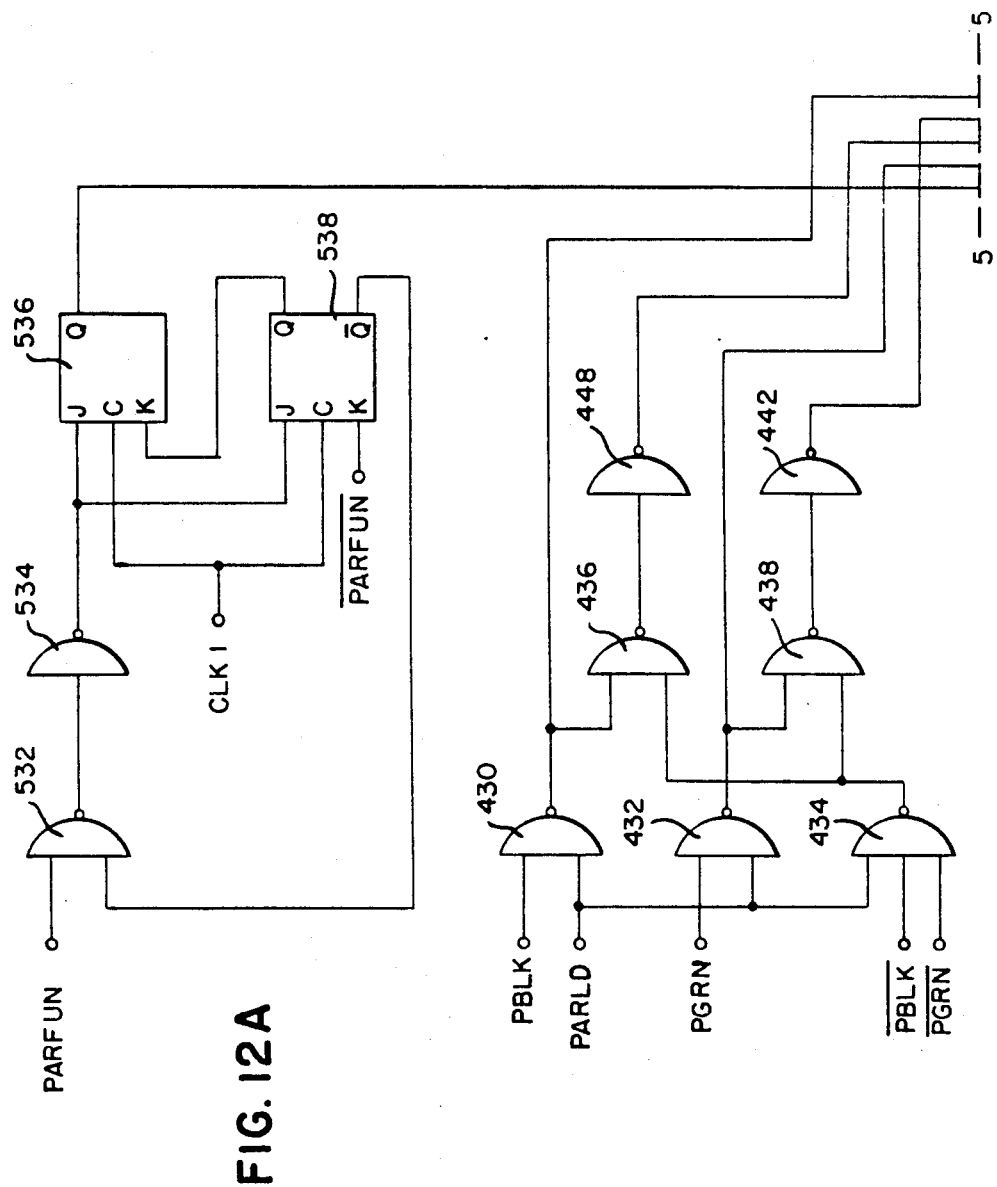

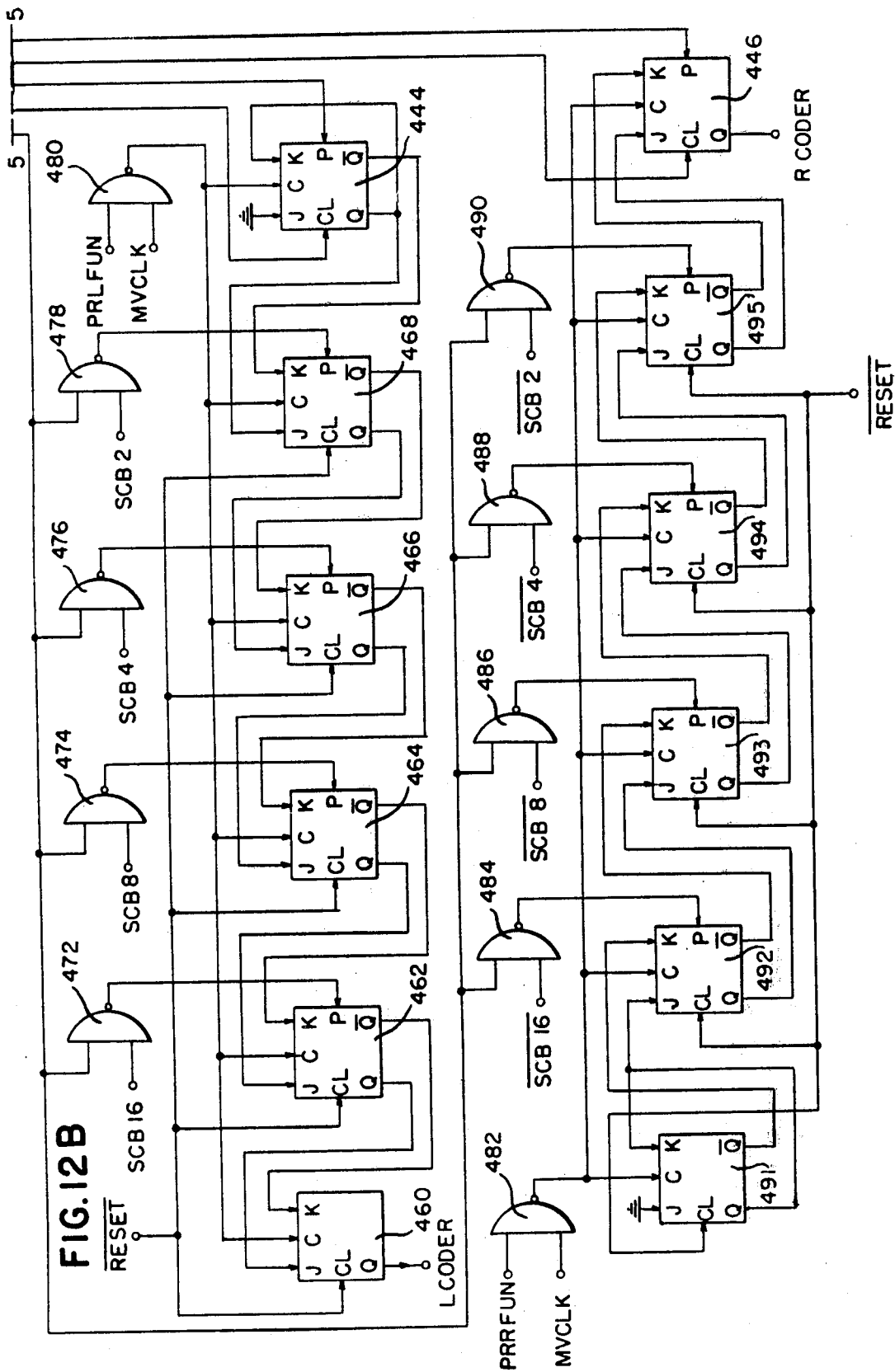

CONTROL MEANS FOR AN OPTICAL BAR CODE SERIAL PRINTER

This is a division of application Ser. No. 51,149 filed June 30, 1970, now U.S. Pat. No. 3,678,465, issued July 18, 1972.

CROSS-REFERENCE TO RELATED APPLICATIONS

The logic of the present invention is incorporated in the printing apparatus system disclosed and claimed in co-pending United States patent application entitled "Optical Bar Code Serial Printer", Ser. No. 51,071, now U.S. Pat. No. 3,707,910, issued Jan. 2, 1973 filed on the same day as the present application. The printing apparatus is of the type which prints color-coded labels to be read by an optical probe scanner such as that disclosed and claimed in co-pending U.S. Pat. application Ser. No. 837,514, filed June 30, 1969, and now U.S. Pat. No. 3,637,993, in the names of John B. Christie, Dzintars Abuls, and Wilfridus G. van Breukelen, Inventors, now U.S. Pat. No. 3,637,993, issued Jan. 25, 1972 and in co-pending U.S. Pat. application Ser. No. 765,528, filed Oct. 7, 1968, and now U.S. Pat. No. 3,555,042, in the names of Clarence W. Kessler, Frank S. C. Mo, Ollah Combs, and Larry D. Miller, Inventors, now U.S. Pat. No. 3,584,779, issued June 15, 1971. The aforementioned applications are assigned to The National Cash Register Company, assignee of the present invention.

BACKGROUND OF THE INVENTION

This invention relates to control logic circuitry for a color bar code printer.

The record medium produced by the apparatus of this invention may be used in semi-automatic mark-sensing systems for check-out counter applications in supermarkets and retail department stores, credit card and inventory control applications, and the like. The record medium may be attached to an item to be sold, for example, and the record medium is read during the sale of the item by an optical probe scanner which is "scribed", or glided, across the record medium.

The record medium produced by the apparatus of this invention utilizes three different indicia, with a first and a second indicia being recorded on one surface of the record medium, which surface is utilized for the third indicium. The finished form of the record medium in one embodiment takes the form of parallel bars of first, second, and third colors. The coded record medium uses transitions of colors to define a binary logic state like a "1" or a "0" rather than use a first color to always define a first binary state and a second color to always define a second binary state, as is done in the prior art. The use of color transitions on the record medium obviates the need for a separate clocking arrangement thereon and considerably reduces the size of the record medium compared to those of the prior art.

Because of the transition code, certain problems were encountered in effecting the design of a logical control scheme for a printer apparatus which would cause a pattern of colors to be printed according to a predetermined code. The chief problem was to design circuitry which would accomplish the above results at relatively low cost. Another problem was to design a control scheme for a printer apparatus which would accurately print the record media according to the predetermined code at a rapid rate while overcoming somewhat severe registration problems. The control logic of the present invention solves these problems.

SUMMARY OF THE INVENTION

This invention relates to control logic for a color bar printing apparatus for recording data on a record medium according to a predetermined code. The apparatus includes a first recording means having a first recording station and adapted to record a first indicium (color) on the medium. A second recording means having a second recording station is also included for recording a second indicium (color) on the medium. Transport means are utilized to move the record medium to the first and second recording stations successively. The record medium is moved to these stations in equal increments by the transport means, so as to provide a plurality of equally-spaced recording locations on the medium. These recording stations are spaced apart a predetermined number of printing locations, so as to enable simultaneous printing of both indicia for a portion of a printing cycle for producing one record medium.

Although the present invention is pertinent to a wide range of applications, it will be explained and illustrated with respect to the printing apparatus disclosed and claimed in the aforementioned co-pending United States patent application entitled "Optical Bar Code Serial Printer". The printer disclosed in that application contains two recording stations including a print hammer at each station. The printer also includes transport means which are utilized to move the record medium to the first and second recording stations successively.

The control logic accepts data from some input device and converts it into an optical color bar code by a binary-to-bar code converter.

The binary-to-bar code converter comprises first and second gating networks, the outputs of which are connected to "green" and "black" flip-flops. The output of the "green" flip-flop actuates means for printing green bars, and the "black" flip-flop likewise causes the printing of black bars. The configuration of the first and second gating networks is such that the output of the first in Boolean algebra is: PBLK DATA + $\overline{\text{PBLK}}$ $\overline{\text{PGRN}}$ DATA, and the output of the second is: $\overline{\text{PBLK}}$ $\overline{\text{PGRN}}$ DATA + PGRN $\overline{\text{DATA}}$, where PBLK is the signal which initiates the printing of black stripes, PGRN is the signal which initiates the printing of green stripes, and DATA is the input data to be recorded on the tag. A white stripe is made a part of the record simply by incrementing the paper transport system, thus utilizing the background of the record medium as the third indicium.

The bar code used to represent the decimal data is a trinary based, binary transition between any two of the three colors — that is, white, green, and black — representing a binary character "0" or "1". The control circuitry effects the energization of the transport means and also the selective energization of the first and second recording means to record the first and second indicia (in the form of colored bars) according to the code. The control circuitry also inhibits the energization of the first and second recording means when the binary-to-bar code converter determines that a third indicium (a white bar) is a part of the color-coded label.

BRIEF DESCRIPTION OF THE DRAWINGS

FIG. 10A illustrates in detail the logic circuitry utilized in entering data.

FIG. 11 is a timing chart for the binary-to-bar code converter.

FIG. 12A illustrates in detail the logic circuitry for generating the parity bits.

FIG. 12B illustrates in detail the logic circuitry for the left and right end code registers.

GLOSSARY AND INDEX OF SIGNALS

Figure 1:
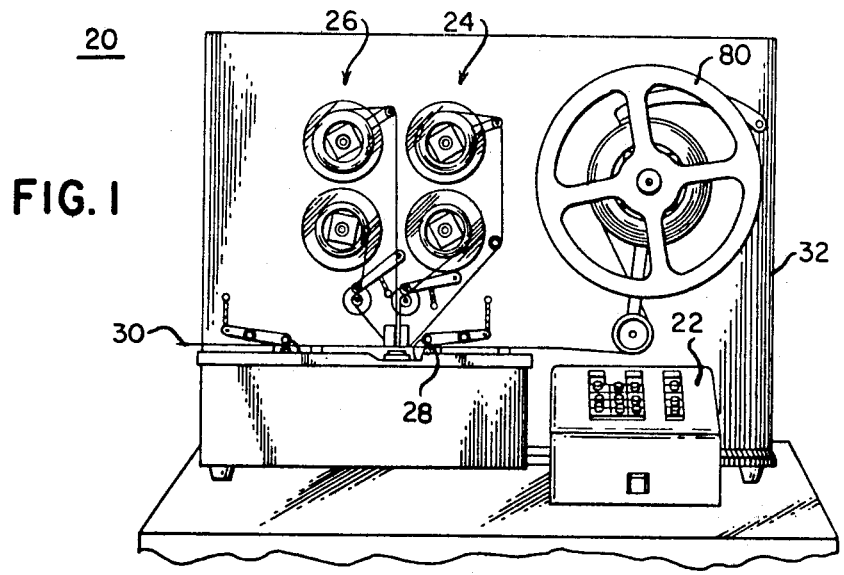
FIG. 1 is a general elevational view of the printing apparatus of this invention showing a keyboard for entering data in decimal form and first and second recording means for printing first and second indicia on a record medium.

In order to facilitate the understanding of the disclosed invention, the symbols and signals appearing in the specification and drawings are tabulated below.

| SYMBOL | DESCRIPTION |
| --- | --- |
| BCC | Output signals of the 4 stage Block Check Character generator 166. |
| BLKHAM | Control signal to the black hammer solenoid 66 for actuating the black hammer head 64. |
| BKRBST | Control signal to the black ribbon step motor 74, thereby placing a fresh ribbon surface over the print bar 60. |
| CLEAR | Control signal utilized as a master reset throughout the printer logic. |
| DABFER | Control signal which allows data in the input data buffer 160 to be loaded into the shift register memory 164. |
| DABTIS DABT2S DABT4S DABT8S | BCD bits representing character that was just entered and generated by the outputs of the NAND gates 266, 268, 270, and 272, respectively. |
| DABUPC | Control signal which loads the above four data bits into the input data buffer 160. |
| DAFUN | Control signal generated by the second state of the function counter 159 for conditioning the printer control logic to receive data which is to be printed. |
| DASTRB | Control signal utilized in sensing the data stored in the shift register 164. |
| DASW0 DASW1 DASW2 DASW3 DASW4 DASW5 DASW6 DASW7 DASW8 DASW9 | Data signals generated by the depression of a corresponding key on the keyboard 22. |
| DATA | Bits stored in the shift register 164. |
| DSROUT | Output signals representative of the data stored in the shift register 164. |
| GNRBST | Control signal to the green ribbon step motor 72, thereby placing a fresh ribbon surface over the print bar 40. |

-continued

| SYMBOL | DESCRIPTION |
| --- | --- |
| GRNHAM | Contrl signal to the green hammer solenoid 46 for actuating the green hammer 44. |
| INBIT 1 INBIT 2 INBIT 4 INBIT 8 | Input data signals generated by the latch circuits 276, 278, 280, and 282. |
| INBUFO | Output data signals from the input data buffer 160. |
| INPDAT | Data entered into the shift register 164. |
| KEYDN | Control signal generated by the key down generator for momentarily enabling the decimal-to-binary code data converter 154. |
| LCODER | Data signals generated by the output of the left end code register 170a. |
| MVCLK | Control signals produced by the master clock utilized in the printing of the data. |
| PARLD | Control signal which conditions the parity generator 163 to generate two parity bits. |
| PBLK | Control signal which initiates the generation of control signals BLKHAM and BKRBST. |
| PCCLR | A reset signal applied to the position counter 300 after a character has been loaded into the shift register memory 164. |
| PCDL | Control signal utilized in synchronizing the input position of the shift register 164 with the output of the input data buffer 160. |
| PGRN | Control signal which initiates the generation of control signals GNREST and GNRHAM. |
| PRFUN | Control signal generated by the third state of the function counter 159 for conditioning the printing control logic to begin printing. |
| PRLFUN | Control signal for printing the information contained in the left end code register 170a. |
| PRNFUN | Control signal for actuating printing of the tag information. |
| PRRFUN | Control signal for printing the information contained in the right end code register 170b. |
| RCODER | Data signals generated by the output of the right end code register 170b. |
| RESET | General reset control signal. |
| SCB2 SCB4 SCB8 SCB16 | Data relating to the number of tag information fields which is stored in the left and right end code registers 170. |
| SHFTCK | Control signal for shifting data out of input data buffer 160. |
| TAFUN | Control signal generated by the first state of the function counter 159 for conditioning the printer logic to receive information relating to the number of tags. |
| — | A bar over a symbol defines the complement of that symbol |

BRIEF DESCRIPTION OF THE PRINTER APPARATUS

A brief description of the type of printing apparatus to be controlled, the subject matter of co-pending United States patent application titled "Optical Bar Code Serial Printer", Ser. No. 51,071, filed on the same day as the present application, is in order for a better understanding of the control logic which is the subject matter of this invention.

FIG. 1 is a general elevational view of the printer apparatus of this invention, which is designated generally as 20. The apparatus 20 broadly includes a keyboard 22, by which input data is entered; first and second recording means 24 and 26, respectively; and transport means 28 for moving a record medium 30, which may be a paper tape, successively to said first and second recording means 24 and 26. Control means are housed in a cabinet 32 for controlling the operation of the transport means 28 and the first and second recording means 24 and 26, so as to record data in the form of colored parallel bars or stripes on the record medium 30 in conformance with a predetermined color code representing binary information.

Figure 2:
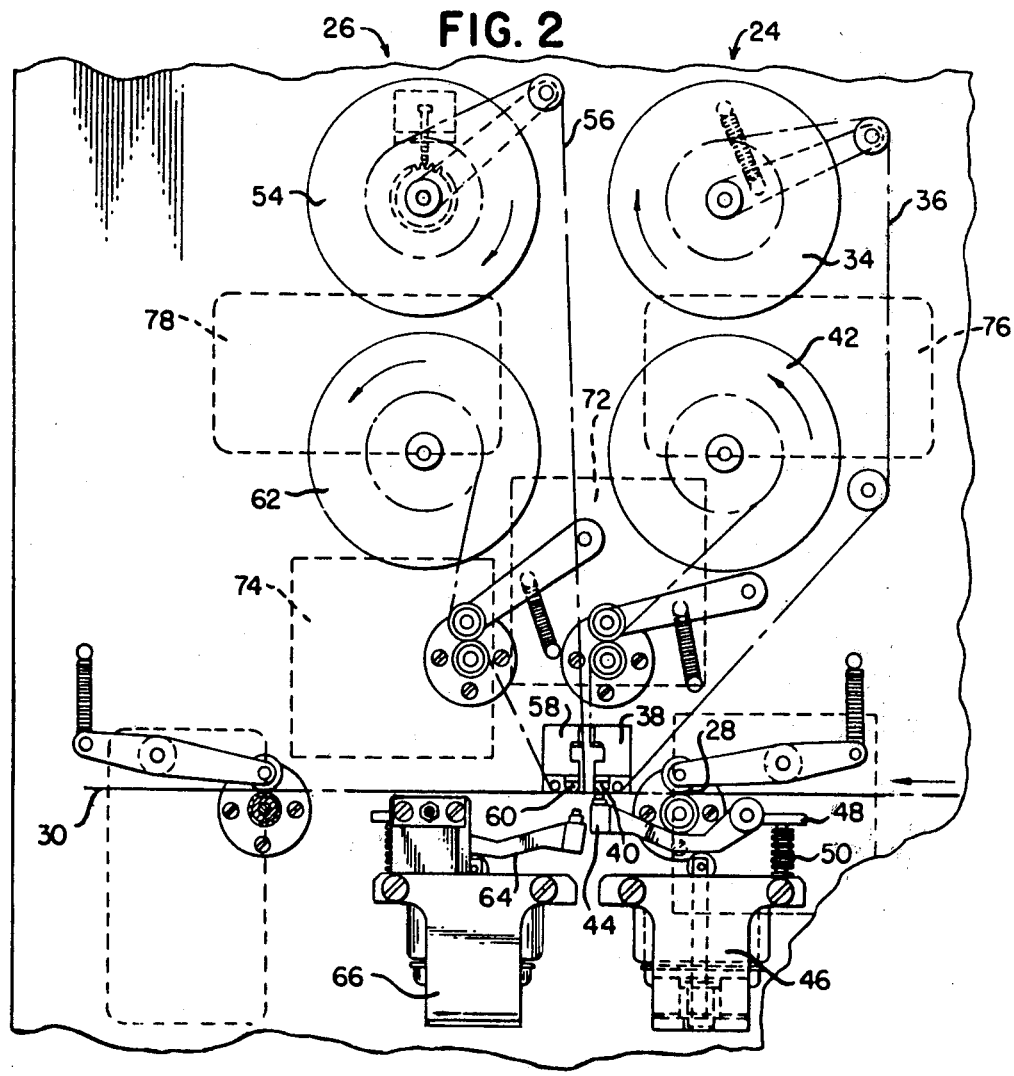
FIG. 2 is an enlarged elevational view of a portion of FIG. 1 showing additional details of the first and second recording means and their associated print stations.

The first recording means 24 is best shown in FIG. 2 and includes a rotatably-mounted supply reel 34. In one embodiment, an inked ribbon 36, used in printing a first indicium (a green color), is incrementally fed from the reel 34 and is routed over a series of rollers to the first print station 38. The ribbon 36, being kept under a resilient tension, passes beneath a print bar 40 as it is wound on a conventionally-driven take-up reel 42.

The first print station 38 also includes print hammer means which comprise a green print hammer 44 and a green hammer actuating solenoid 46. The print hammer is adapted to strike the print bar 40. A compressively-loaded spring 50 is positioned between an extension 48 and the frame of the solenoid and is used to pivot the print hammer 44 counter-clockwise (as viewed in FIG. 2) to an inoperative position. When the solenoid 46 is energized, the print hammer 44 is caused to rotate clockwise against the bias of the spring 50, causing the print bar 40 to effect the printing of a green bar 92a (FIG. 3A) on a record medium 30.

The second recording means 26 is also shown in FIG. 2 and is constructed in the same manner as the first recording means 24; therefore, a detailed description of the second recording means 26 need not be given. The second recording means 26 includes a supply reel 54 for supplying a ribbon 56 used in printing a second indicium (a black color), which ribbon is routed over a series of rollers to a second print station 58, passing beneath a print bar 60 and on to a take-up reel 62. The print bar 60 is spaced from the print bar 40 a predetermined distance, 24 bar widths in one embodiment, and is provided with adjustment screws to provide the spacing between the print bars 40 and 60. The first and second print stations 38 and 58 have a space between them enabling the ribbons 36 and 56 to be threaded therebetween.

The second print station 58 also includes a black print hammer 64 and a black hammer actuating solenoid 66. Since the second printing station 58 is identical to the first printing station 38, it is sufficient to state that, when the solenoid 66 is energized, the print hammer 64 strikes the print bar 60 to effect printing of a black bar 92b (FIG. 3A) on a record medium 30.

Figures 3A, 3B:
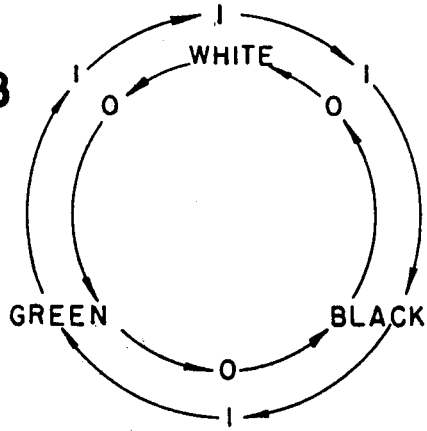
FIG. 3A is a plan view of the record media printed by the apparatus shown in FIG. 1.
FIG. 3B is a graphic description of the color transition code.

The first and second ribbons 36 and 56 are moved by green and black ribbon drives 72 and 74, respectively, which comprise conventional stepping motors. A conventional take-up drive clutch 76 is utilized to wind the used portion of the ribbon 36 on the take-up reel 42. Similarly, a take-up drive clutch 78 winds the used portion of the ribbon 56 on the take-up reel 62. A label 90 printed by the printing apparatus 20 is illustrated in FIG. 3A. The label 90 consists of a plurality of contiguous colored bars 92, each colored bar being one color of three or more colors and of a color different from the color of an adjacent colored bar. The colors employed in the label of FIG. 3A are green, black, and white. The green and black colored bars are printed on a white background, so that the white colored bars are defined by areas where no green or black colored bars exist. Illustrated above the label (for a better appreciation of the invention only) are the bit values represented by the color transitions in conformance with the color transition code of FIG. 3B. Although only one label is shown, the record medium 30 may and does consist of a plurality of labels 90 (FIG. 3), which are joined together in the form of a tape perforated in order to facilitate their separation into individual labels after printing. The record medium or tape 30 is fed from a supply reel 80 as the printing process occurs.

The total information field of a label consists of four parts:

1. left end code,
2. binary coded decimal (BCD) representation of the data digits,
3. block check character (BCC), and
4. right end code.

Both the left and right end codes contain a direction bit, which is always "zero" when scanning left to right, and which is always "one" when scanning right to left; a size code; and a longitudinal parity bit. The size code specifies the number of decimal data fields which are contained on the label, each field containing four bits. The right size code is the transposed inverse of the left size code. The longitudinal parity is a simple MOD-3 parity which specifies that the first printed bar on the label must be of a green color and that the last printed bar must be black. This results in the white-to-green and black-to-white transition, respectively, at the left and right ends of the label 90, which are required for the two zero direction bits. It is noted here that the words "tag" and "label" are used interchangeably. The two parity bits are so selected that the MOD-3 sum of the "one" bits and the "zero" bits is equal.

The block check character (BCC) is a means of providing a data check for a tag or label reader. Its purpose is to insure that the sum of each of the $2^0$, $2^1$, $2^2$, and $2^3$ bits for each decimal digit of all the data is even. The data field in the center of the tag is a binary-coded decimal representation of the decimal data digits, the least significant bit of the most significant data digit being at the extreme left of the field.

In one embodiment of the invention, the width of the colored bars 92 (FIG. 3) is 0.015 inch as measured along the direction of travel of the record medium 30 under the printing stations 38 and 58. The bars 92a are printed in a green color by the first recording means 24, and the bars 92b are printed in a black color by the second recording means 26. The bars 92c are produced by utilizing the background of the record medium 30, which in this embodiment is white, and by indexing the record medium an incremental amount of 0.015 inch without actuation of either the first or the second recording means. The green and black ribbons 36 and 56 are fed past their respective printing stations 38 and 58 in increments of 0.020 inch prior to actuating the associated print hammers 44 and 64 in order to insure that an unused portion of the ribbons is available for printing the colored bars. The particular indicia selected for the particular apparatus for recording data are, of course, dependent upon particular design requirements and are not restricted to the aforementioned colors nor the dimensions.

LOGIC COMPONENTS

Figure 4:
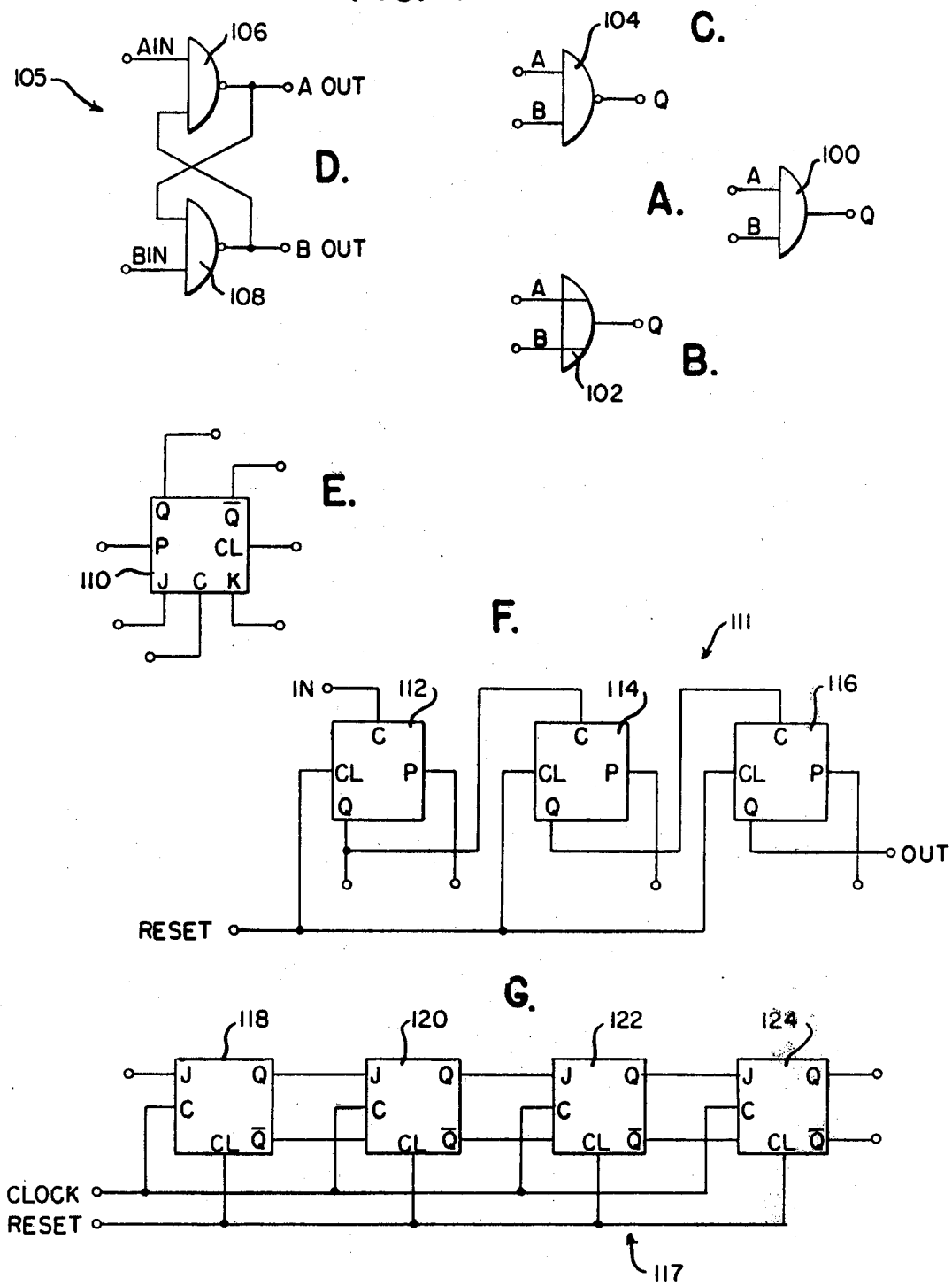
FIG. 4 illustrates, generally, logic circuits utilized herein.

FIG. 4 illustrates the various logic circuits utilized in the printer control logic. The circuitry utilized in this printer control logic is primarily of the integrated circuit type. Although these integrated circuit modules are well known to those skilled in the art, a brief description will be given for the modules used in the printer control logic. It is noted that throughout this specification the terms "true" and "1" are used interchangeably, as are the terms "false" and "0", the first group of terms referring to the presence of a signal and the second group of terms referring to the absence of a signal.

AND GATE

FIG. 4A illustrates an AND gate 100 having two inputs A and B and one output Q. The AND gate operates in such a manner that the output of the AND gate 100 will go "true" if and only if all the inputs to the AND gate 100 are true. The Boolean expression for the operation of the AND gate 100 is Q = A·B.

OR GATE

FIG. 4B illustrates an OR gate 102 having one output Q and two inputs A and B. The operation of the OR gate 102 is such that the output Q will assume a true state if either A or B is true. The Boolean expression for the operation of the OR gate is Q = A+B.

NAND GATE

Illustrated in FIG. 4C is a NAND gate 104 having one output Q and two inputs A and B. A NAND gate is composed of an AND gate followed by an inverter. The NAND gate 104 operates in such a manner that Q is true when either A or B is false or when A and B are both false. Q is false when both A and B are true.

The Boolean expression for the NAND gate 104 is $$Q = \vec{A} + \overline{B} + \overline{A \cdot B} = \overline{A} + \overline{B} \text{ simplified}$$

LATCH CIRCUIT

Illustrated in FIG. 4D is a simple latch circuit 105 composed of two NAND gates 106 and 108 with input terminals A and B, respectively, in which the output of the NAND gate 106 forms one of the inputs of the NAND gate 108 and the output of the NAND gate 108 forms one of the inputs of the NAND gate 106. In the normal, quiescent, state of the latch circuit 105, the output of the NAND gate 106 is false and the output of the NAND gate 108 is true, and inputs A and B are both true. Upon the application of a false signal at A, the output of the NAND gate 106 goes true. This signal is applied to one input of the NAND gate 108. This results in the output of the NAND gate 108 going false, said signal being applied to the input terminal of the NAND gate 106, thereby holding the output of the NAND gate 106 true.

FLIP-FLOP MODULE

FIG. 4E illustrates a flip-flop module 110 having a set terminal J, a clock terminal C, a reset terminal K, a preset terminal P, a clear terminal Cl, a true output Q, and an inverted output $\overline{Q}$. A true signal applied to the set terminal J results in a true output at Q upon the application of a clock pulse. The application of a true signal at the reset terminal K causes the output at Q to go false and the output at $\overline{Q}$ to go true upon the application of a clock pulse. The preset terminal P and the clear terminal Cl are normally at a true state. The application of a false signal at P or Cl actuates the flip-flop module; no clock signal is required.

COUNTER MODULE

FIG. 4F illustrates a counter 111, comprising a cascade of flip-flops 112, 114, and 116, in which the Q output of one flip-flop is coupled to the clock terminal of the next flip-flop and so on down the line. At zero time, all the flip-flops are cleared by application of a reset signal to the Cl terminals of all the flip-flops, thereby causing the outputs at Q to be false. The first pulse applied to terminal C of the flip-flop 112 causes its Q output to go true. This true signal is applied to the clock terminal of the flip-flop 114, but, because of the arrangement of the electrical configuration of the flip-flops, the flip-flop 114 will not toggle until the arrival of the next clock pulse. Therefore, upon the application of a first clock pulse, a binary number 100 will have been placed into the counter, and, upon the application of a second clock pulse, a binary number 010, etc. These counters are well known and are commonly called ripple counters.

SHIFT REGISTER

FIG. 4G illustrates a conventional shift register 117, composed of flip-flops 118, 120, 122, and 124, in which the true output Q of one flip-flop is applied to the set terminal J of a succeeding flip-flop and the inverted output $\overline{Q}$ of one flip-flop is applied to the reset terminal K of a succeeding flip-flop, and so on down the line. An input signal at the J terminal of the flip-flop 118 is transmitted to the flip-flop 120 upon the application of a first clock pulse. Upon the application of subsequent clock pulses, this bit of information will eventually exit from the flip-flop 124.

DESCRIPTION OF THE INVENTION

The present invention relates to control logic for printing apparatus and particularly to printing apparatus for the printing of information in the form of colored bars or stripes. Some of the circuitry utilized in the present invention is well known to those skilled in the art, and these circuits will therefore not be described in detail. Block diagrams will be used where possible in the description of the printer control logic.

Figure 5:
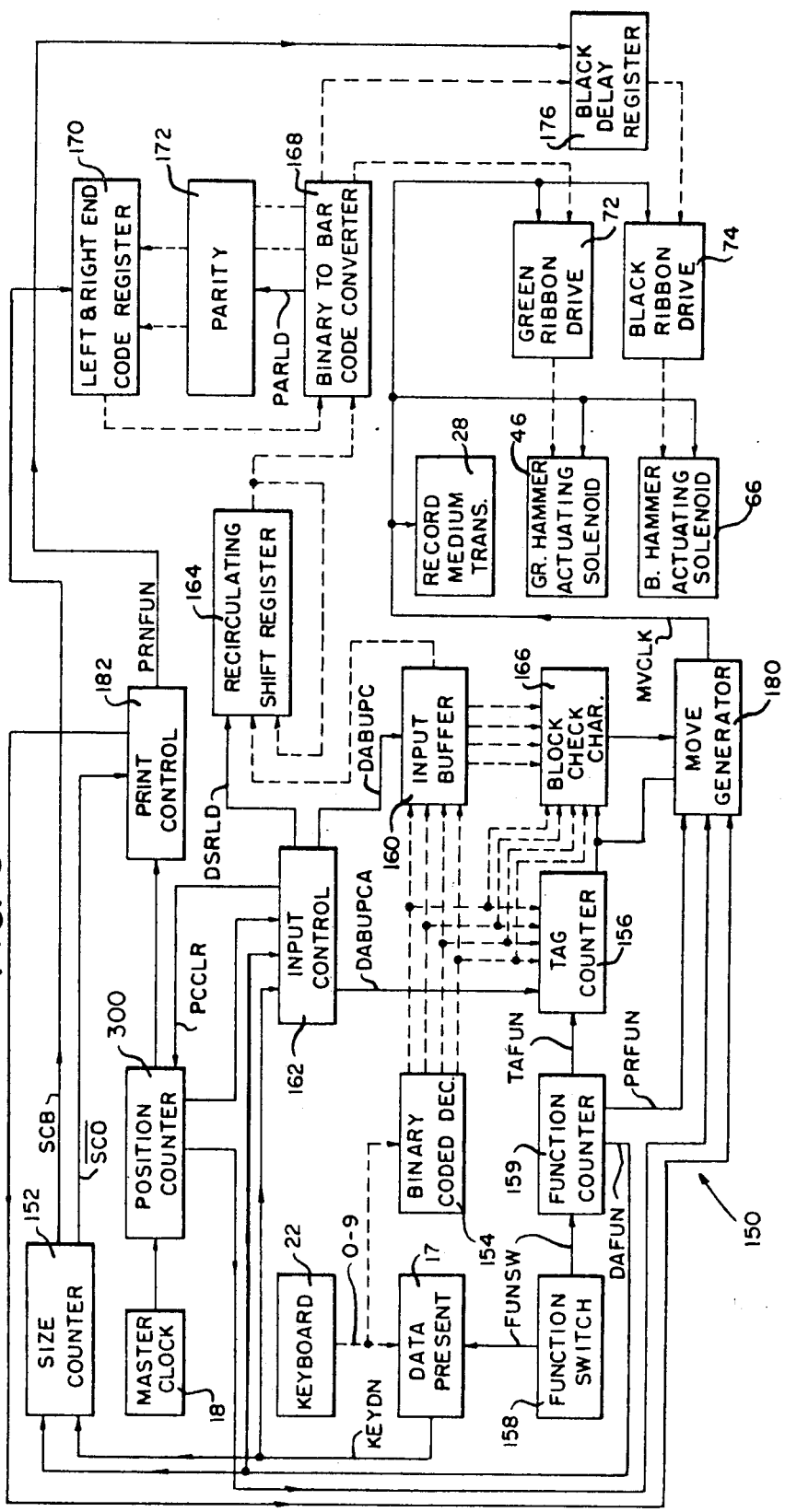
FIG. 5 is a schematic diagram in block form of the control logic for the color bar printer of the present invention.

Reference is made to FIG. 5, which illustrates, diagrammatically, a control system for printing information in the form of light-reflecting indicia; i.e., colored bars or stripes.

In order to simplify and minimize the description of the present invention, certain assumptions have been made. For example, error checks have not been shown, recycling or repeating control circuits have not been illustrated, end-of-tag or end-of-ribbon commands have not been shown, etc. However, these omissions are not to be construed as limitations of the present invention, since it is well known to those skilled in the art that these features could easily be added without changing the operation or the function of the printer control logic.

Referring to FIG. 5, the reference numeral 150 denotes generally printer control logic circuitry for a printing apparatus which records data according to a predetermined color code upon a record medium. Information is entered into the logic system through a standard keyboard 22. However, other input means, such as tapes, computer outputs, etc., may be utilized.

A function counter 159 determines what operations are to be performed by the printer control logic circuitry 150. Initially, the function counter 159 is in a first state, during which a signal designated as TAFUN is generated. The signal TAFUN conditions the printer logic to accept data relating to the number of tags which are to be printed. Tag information is entered into the logic system through the keyboard 22 and is transmitted to a decimal-to-binary coded decimal converter (BCD) 154, where it is converted to binary form by conventional means. From the BCD converter 154, the data is transmitted to a tag counter 156. Upon entering the tag information, it is necessary to depress a function switch 158, which sets the function counter 159 to a second state, during which a signal designated as DAFUN is generated. The signal DAFUN conditions the printer control logic circuitry 150 to accept data which is to be printed. This data is also entered into the printer control logic circuitry via the keyboard 22 and is transmitted to the BCD converter 154, from which it is further transmitted to an input data buffer 160. Data processed by the BCD converter 154 and stored in the data buffer 160 is in the form of bits, evidencing a "1" state or a "0" state, four bits to a word. Data stored in the data buffer 160 is then transmitted to a recirculating shift register 164, which is capable of storing 128 bits, therefore functioning as a memory. The output of data from the data buffer 160 is controlled by an input control 162, which synchronizes the input reference point of the recirculating shift register 164 with the output of the input data buffer 160. Simultaneously with the entering of each decimal data digit into the system, a signal is transmitted to a size counter 152, which is incremented for each data digit. This information is utilized by the printer control logic circuitry 150 to determine the number of digit fields which are to be printed on a tag or label, these terms being synonymous for this application. Upon entering all the data fields which are to be printed on the label 90, it is necessary to depress the function switch 158 again, thereby placing the function counter 159 in a third state, during which a signal PRFUN is generated, which conditions the printer control logic circuitry to commence the printing process. Upon depression of the function switch for the second time, and prior to the time at which printing actually takes place, a block check character digit BCC is generated by a block check character (BCC) generator 166. This BCC digit is entered into the input data buffer 160, from which it is transmitted to the recirculating shift register 164, thereby being made part of the data which is to be printed on each label. The BCC digit provides a means of error detection for the reader, which is designed to read the type of color-coded label illustrated in FIG. 3A. Upon entering the BCC digit into the recirculating shift register 164, the printer control circuitry 150 is then conditioned to first generate a pair of parity bits, which are generated in the parity generator 172. The parity bits insure that the first printed indicium on the label 90 is a green bar and that the last printed indicium is a black bar. This results in the white-to-green and black-to-white transitions at the ends of the tag, which are required for the two zero direction reference bits. The parity bits are stored in a left end code register 170a and in a right end code register 170b, which also contain information from the size counter 152 for defining the number of data fields for each label 90. Upon the generation of the parity bit information, the logic system is conditioned for printing.

All the data which is to be printed is first coded by a binary-to-bar code (BBC) converter 168. The BBC converter 168 codes the data into a trinary-based code which determines which of the three indicia is to be printed. A PGRN signal (print green) is generated and transmitted to the first print station; i.e., the green hammer actuating solenoid 46 in the event the printed indicium is to be green (first indicium). A PBLK signal (print black) is generated and transmitted via a 24-bit delay register 176 to the second print station; i.e., the black hammer actuating solenoid 66 in the event the printed indicium is to be black (second indicium). In the event the third indicium (white) is to be printed, the BBC generator inhibits the generation of the signals PGRN and PBLK.

The paper transport means 28 is incrementally moved a distance of one bar width by a controlled clock pulse, so that a clean area of the record medium 30 is positioned under the print hammers 44 or 64 for printing. A white indicium is recorded simply by incrementally moving the record medium 30 with the print hammers 44 and 64 both inhibited.

The printing operation consists of five steps:
A. Placing a space equal to seven bar widths on the left end of the label.
B. Printing the information stored in the left end code register 170a.
C. Printing the data stored in the shift register 164.
D. Printing the information stored in the right end code register 170b.
E. Placing a space equal to seven bar widths on the right end of the label.

FUNCTION COUNTER

Figure 6:
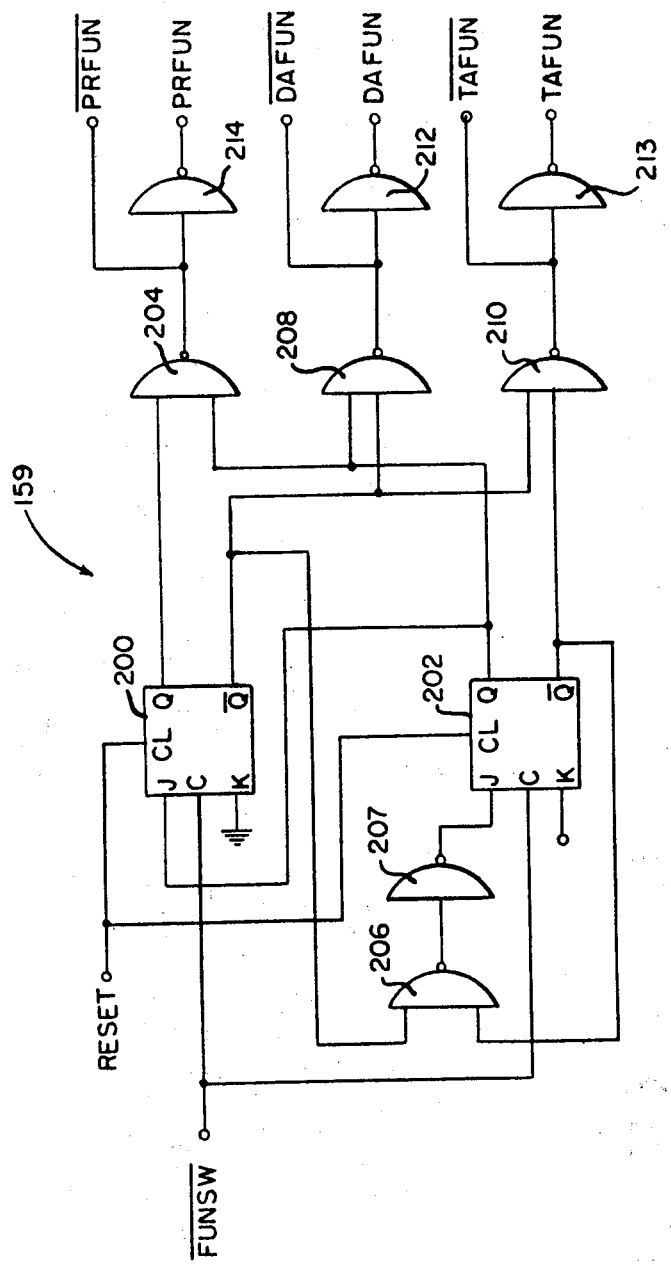
FIG. 6 illustrates in detail the function counter.

FIG. 6 is the logic diagram for the three-stage function counter 159, which determines whether the printer logic 150 is in the TAFUN signal generating state (tag data information state) or in the DAFUN signal generating state (receiving data which is to be printed state) or in the PRFUN state (printing state-keyboard entry of data is blocked). The function counter 159 is a flip-flop counter, comprising a pair of flip-flops 200 and 202. The function counter 159 counts through three states, depending upon the states of the flip-flops 200 and 202, which are toggled sequentially into a true state by the application of a false signal $\overline{FUNSW}$, which is generated by the actuation of the function switch 158.

The Q output of the flip-flop 200 is coupled to one of the inputs of a NAND gate 204, and the $\overline{Q}$ output is coupled to one of the inputs of NAND gates 206, 208, and 210, the NAND gate 206 having an output which is coupled to the J terminal of the flip-flop 202 via a NAND gate 207, which is used for inversion purposes. The Q output of the flip-flop 202 is coupled to one of the inputs of the NAND gates 204 and 208 and also to the J set terminal of the flip-flop 200, while the $\overline{Q}$ output is coupled to one of the inputs of the NAND gates 206 and 210.

Initially, at a time prior to T 1 (FIG. 8), the flip-flops 200 and 202 are in a reset condition; therefore the Q outputs of both flip-flops are false. The NAND gate 204 is thus receiving, at its two input terminals, the false signal from the Q output of the flip-flop 200 and the false signal from the Q output of the flip-flop 202, which results in the NAND gate 204 having an output which is designated as signal $\overline{PRFUN}$, which at this point in time is true. The output of the NAND gate 204 is also applied to a single input of a NAND gate 214, the output of which is inverted and designated as signal PRFUN.

The false signal from the Q output of the flip-flop 202 and the true $\overline{Q}$ output from the flip-flop 200 are applied to the input terminals of the NAND gate 208, resulting in an output designated as $\overline{DAFUN}$, which at this point in time is true. The output of the NAND gate 208 is also applied to the one input of the NAND gate 212, the output of which is inverted and designated as signal DAFUN.

The true signal from the $\overline{Q}$ output of the flip-flop 200 and the true signal from the $\overline{Q}$ output of the flip-flop 202 are applied to the input terminals of the NAND gate 210, resulting in an output designated as $\overline{TAFUN}$, which at this point in time is false. The false output of the NAND gate 210 is also applied to the one input of a NAND gate 213, for inversion purposes only, the output of which is true and is designated as TAFUN.

The false Q output of the flip-flop 202 is applied to the J terminal of the flip-flop 200. The true $\overline{Q}$ outputs from the flip-flops 200 and 202 are applied to the two inputs of the NAND gate 206, resulting in a false output which is inverted into a true signal by the NAND gate 207 and is applied to the J terminal of the flip-flop 202. Therefore it can be seen that, prior to T 1, TAFUN is true and DAFUN and PRFUN are both false.

Depression of the function switch 158 at T 1 renders FUNSW true, thereby setting the complement $\overline{\text{FUNSW}}$ false, which is applied to the clock terminals of the flip-flops 200 and 202, thus toggling the flip-flop 202 into a true state. The flip-flop 200 remains in a false state because of the false signal applied to its J terminal from the Q terminal of the flip-flop 202 prior to the flip-flop 202 being set true. At this time, the true signal Q from the flip-flop 202 and the true $\overline{Q}$ signal from the flip-flop 200 are applied to the two input terminals of the NAND gate 208, resulting in a false output, which renders signal $\overline{\text{DAFUN}}$ false. The signal DAFUN is rendered true because of the inverting NAND gate 212. The NAND gate 210 receives the now false $\overline{Q}$ output of the flip-flop 202 and the true $\overline{Q}$ output of the flip-flop 200, which renders the signal $\overline{\text{TAFUN}}$ true, and the signal TAFUN is rendered false because of the inverting NAND gate 213. The output of the NAND gate 204 remains true because of the false Q output from the flip-flop 200. Thus at T 1 — i.e., after the initial depression of the function switch 158 — the signal DAFUN is true, and the signals TAFUN and PRFUN are both false.

A similar analysis holds true at time T2, when the function switch 158 is depressed for the second time, thereby toggling the flip-flop 200 to a true state, while the flip-flop 202 is held in a true state because of the false signal coupled to its K terminal. The output of the NAND gate 204 now goes false, thereby rendering the signal PRFUN true. Simultaneously, the output of the NAND gate 208 goes true, therefore rendering the signal DAFUN false, while the signal TAFUN remains false until the function counter 159 is reset.

DATA ENTRY

FIG. 10A illustrates the logic circuitry necessary for the introduction of decimal data, although not necessarily limited to decimal data, into the printer control logic. A NAND gate 250 is illustrated as having its input terminals connected to the normally true output signals of the keyboard keys $\overline{\text{DASW0}}$ through $\overline{\text{DASW9}}$, including the normally true output of the function switch 158, the signal of which is designated $\overline{\text{FUNSW}}$. NAND gates 254, 256, 258, 260, and 262 are shown having their inputs connected to certain ones of said keys. The output of each of these NAND gates is normally false, since all the inputs are normally true. Depression of a key renders the associated signal false, which sets the output of a corresponding NAND gate true. The output of the NAND gate 250 is coupled to a Key Down Generator 264 for the generation of a KEYDN signal whenever the output of the NAND gate 250 is true, which occurs whenever a key is depressed. KEYDN, a true signal, is transmitted to one of the input terminals of NAND gates 266, 268, 270, 272, and 274 for the purpose of momentarily enabling them. Selected ones of the keyboard keys are connected to the inputs of selected ones of the NAND gates 254, 256, 258, 260, and 262, the outputs of which are connected to one of the inputs of the NAND gates 266, 268, 270, 272, and 274, respectively. It can therefore be seen that, when a key is depressed, the signals corresponding to that key will be observed at the output of the NAND gates 266, 268, 270, 272, and 274.

As was previously mentioned, the key down generator generates a signal labeled KEYDN, a positive-going pulse (FIG. 7), which conditions the NAND gates 266, 268, 270, 272, and 274 to pass any signal transmitted from the NAND gates 254, 256, 258, 260, and 262. For example, if it were desired to enter the digit 5, the outputs of the NAND gates 254 and 258 would go true, while the outputs from the NAND gates 256 and 260 would remain false, thereby establishing a binary number 1010 (least significant digit first) equivalent to the decimal digit 5.

Figure 10B:
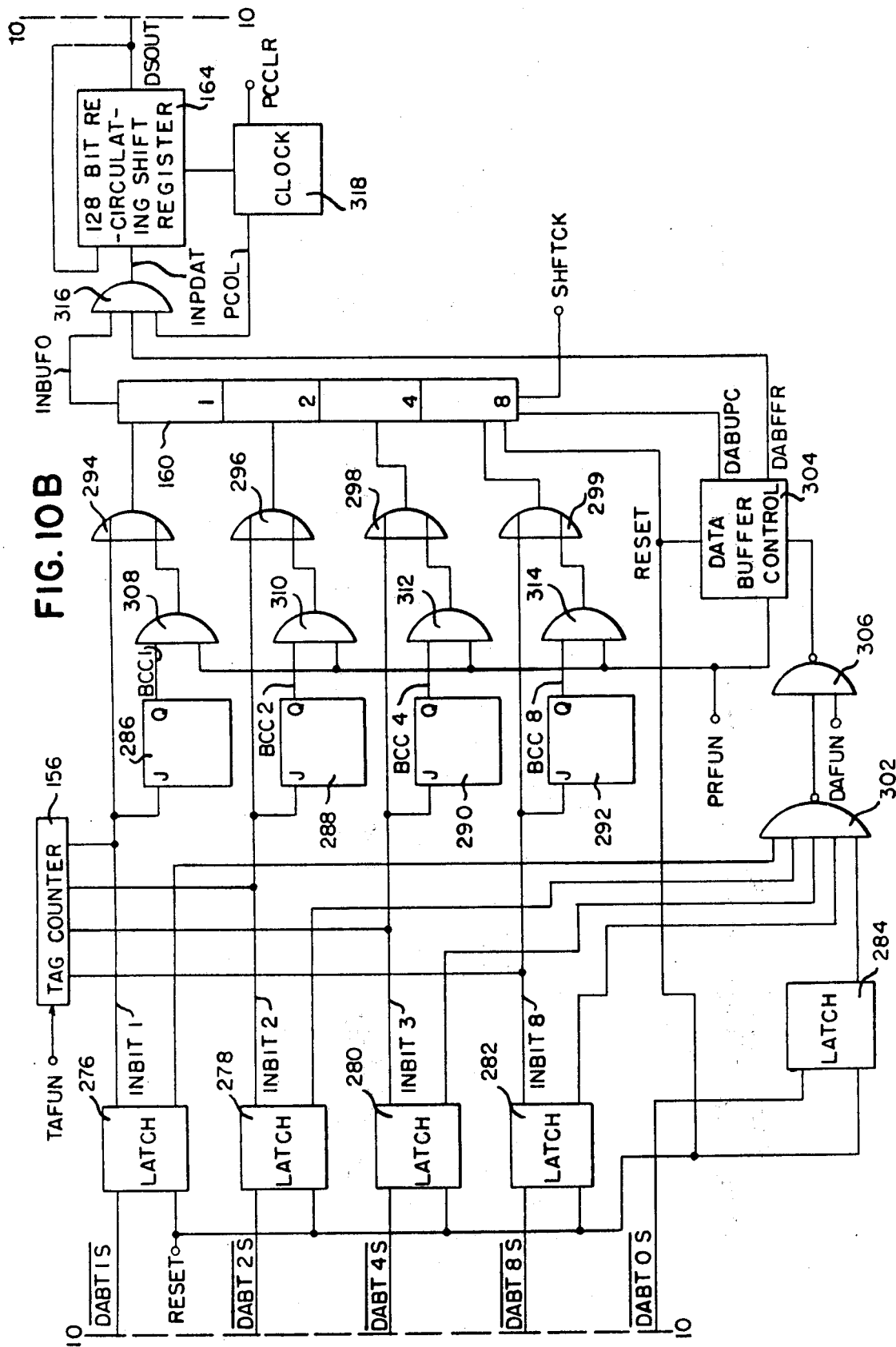
FIG. 10B is an extension of FIG. 10A illustrating in detail the logic circuitry for entering data into the shift register.

The outputs from the NAND gates 266, 268, 270, 272, and 274, herein defined as bits, are transmitted in parallel to latch circuits 276, 278, 280, 282, and 284 (FIG. 10B). These latch circuits provide a temporary memory for the transmitted bits. The true terminals of the latch gates 276, 278, 280, and 282 are connected to the tag counter 156, to corresponding J terminals of flip-flops 286, 288, 290, and 292, respectively, also referred to as the BCC character flip-flops, and also to one of the input terminals of OR gates 294, 296, 298, and 299, respectively. The false output terminals of the latch circuits 276, 278, 280, 282, and 284 are connected in parallel to a NAND gate 302. The Q output terminal for each of the flip-flop modules 286, 288, 290, and 292 is connected to one of the input terminals of a corresponding AND gate 308, 310, 312, and 314, respectively. The output of each of the AND gates 308, 310, 312, and 314 is connected to the second input terminal of the OR gates 294, 296, 298, and 299, respectively, whose outputs in turn are connected in parallel to an input data buffer 160, which is a conventional flip-flop register. The signal PRFUN forms the remaining input to the AND gates 308, 310, 312, and 314.

The output of the data buffer 160, designated as INBUFO, forms one of the inputs for an AND gate 316, two other inputs being formed by signal DABFFR from a Data Buffer Control 304 and signal PCOL from a clock 318.

The output of the AND gate 316 is shown connected to the input of the recirculating shift register 164. The shift register 164 is controlled by clock pulses generated by the clock 318, which also generates a signal PCCLR, which reconditions the logic for input of another digit by generating a RESET signal, as well as the previously-mentioned PCOL signal.

Figures 7, 8:
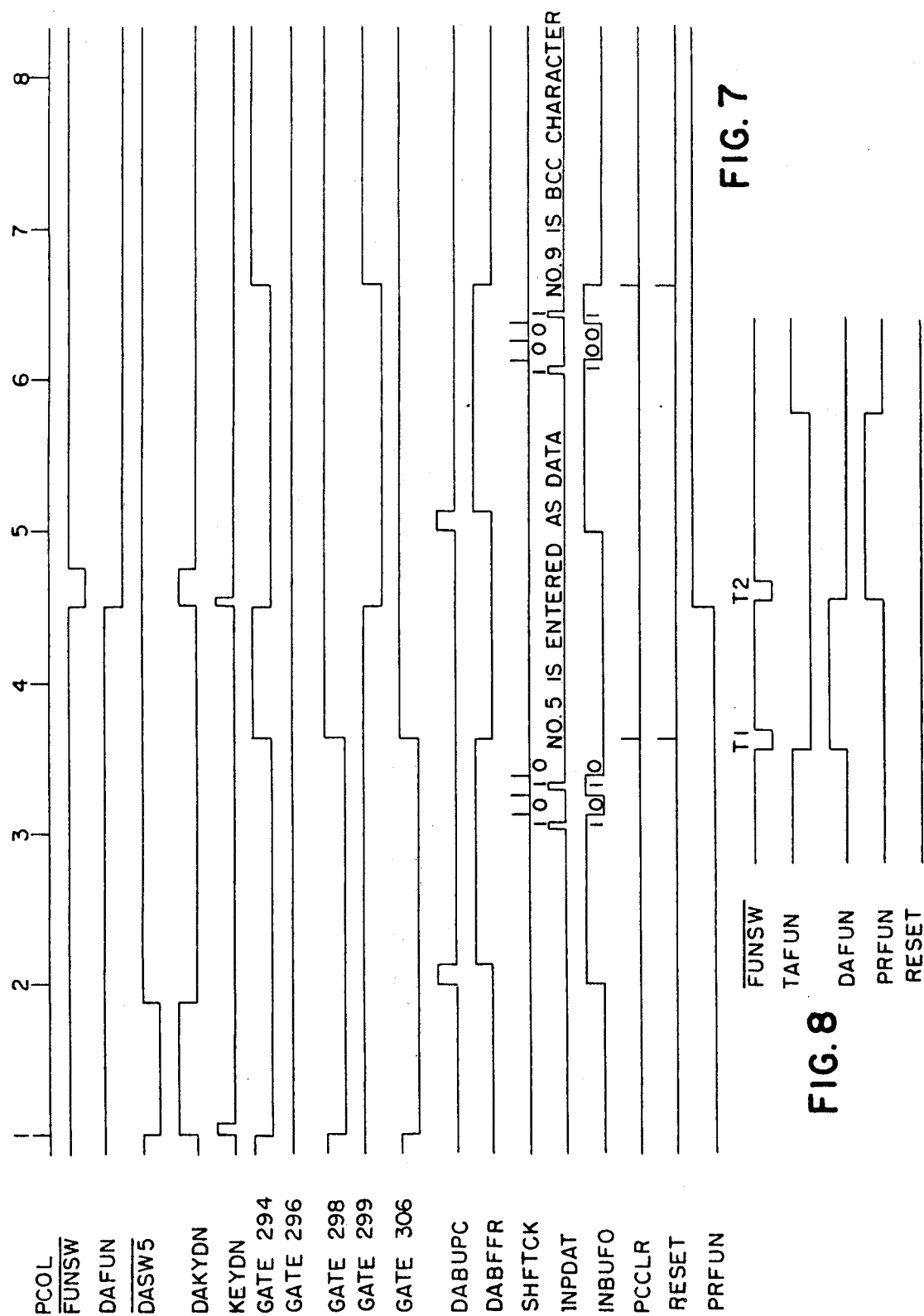
FIG. 7 is a timing chart for data entry.
FIG. 8 is a timing chart for the function counter.

The operation of the circuit of FIG. 10B will now be explained with the aid of the waveforms shown in FIGS. 7 and 8. As was previously explained, depression of a key results in the introduction of decimal data into the printer control logic circuitry, which initially effects the conversion of the data into a four-bit binary-coded-decimal character. The four bits are transmitted in parallel to the latch circuits 276, 278, 280, and 282, respectively, where they are temporarily stored for transmission to the tag counter 156 and to the OR gates 294, 296, 298, and 299 for transmission to the input data buffer 160. The four bits are directed to the tag counter 156 only if the function counter 159 is in the true TAFUN signal generating state, or are directed to the input data buffer 160 only if the function counter 159 is in the true DAFUN signal generating state. The tag counter 156 is a conventional counter having a units ring and a tens ring. Since the tag counter 156 is so designed that the tens address ring is filled before the units ring, it is necessary, when entering information relating to the number of tags, first to depress a key representing the tens position and then to depress a key representing the units position. Upon entering the number of tags to be printed into the tag counter 156, it is necessary to depress the function switch 158 for the first time, thus placing the function counter 159 in the true DAFUN signal generating state. This results in the function counter 159 conditioning the printer control logic circuitry 150 to receive data for printing.

The signal PRFUN is transmitted to one of the input terminals of the AND gates 308, 310, 312, and 314, and, since PRFUN is false at this time, the output signals of these gates will always be false. This false signal output is transmitted to one of the input terminals of each of the OR gates 294, 296, 298, and 299, which conditions those OR gates to transmit whatever signals are received from the latch circuits 276, 278, 280, and 282, which are then transmitted in parallel to the input data buffer 160. Here the information will be temporarily stored until serially transmitted to the recirculating shift register 164. When the DABFFR and PCOL signals are true, the AND gate 316 is conditioned to pass through and transmit to the shift register 164 any information, designated as signal INPDAT (FIG. 7), which is in the low order flip-flop of the input data buffer 160. The signal DABFFR is true when data is in the input buffer 160 ready for loading into the shift register memory 164, and PCOL is true when the shift register reference position comes to the loading point. Upon the transmission of the first bit stored in the low order flip-flop of the data shift register 160, clock signals SHFTCK, generated by a conventional shift clock, not shown, shift the next higher order bit into the low order bit position, whence it is transferred to the shift register 164. Three shift pulses will occur, which results in all the data (that is, all four bits) being loaded into the shift register 164. At the conclusion of loading the fourth bit into the shift register 164, a PCCLR signal is generated, at which time the system is ready to receive new data.

The size counter 152, comprising a conventional ripple flip-flop counter, is incremented every time that a data key is depressed during the DAFUN state. The size counter 52 thus stores information relating to the number of digits entered into the printer control logic circuitry for printing. This information is transmitted to and stored in the left and right end code registers 170a and 170b for use in the printing cycle. The size counter 152 also transmits a size counter zero signal $\overline{SCO}$ to the print control 182, which is also utilized during the printing cycle. The print control 182 selects the data to be printed and may comprise conventional flip-flop circuitry which in turn is controlled by outputs from a position counter 300 and the size counter 152.

The printer control logic circuitry 150 will be in a position to enter the printing cycle of its operation at the time when all the keyboard data has been loaded into the shift register 164. In order to enter the printing cycle, it is necessary again to depress the function switch 158, which increments the function counter 159 to a true PRFUN signal generating state, thus rendering the DAFUN signal false and retaining the TAFUN signal false. At this time, whatever information is contained in the Block Check Character (BCC) flip-flops 286, 288, 290, and 292 is transmitted, in parallel, to the input terminal of the AND gates 308, 310, 312, and 314, respectively. These bits will pass through because the other input terminals of these respective gates are all receiving a true PRFUN signal, which conditions the AND gates to pass through information which is contained in the Block Check Character flip-flops. The output of the AND gates 308, 310, 312, and 314 is transmitted in parallel to the OR gates 294, 296, 298, and 299, respectively, and on to the data buffer 160. This information is then transmitted serially into the 128-bit shift register 164, where it is made a part of the data which is to be printed. These last four bits make up what is called a block check character (BCC) digit. The BCC digit is a means of providing a data check for the tag reader which is to read the color-coded tag 90, an embodiment of which is shown in FIG. 3. Its purpose is to insure that the sum of each bit position of each decimal digit of all the data is even. Thus, the final condition of the flip-flops 286, 288, 290, and 292 determines whether a one bit or a zero is necessary to make the bits come out even.

MASTER CLOCK

A master clock 18 is utilized to generate signals which condition the printer control logic circuitry to perform certain specified functions during the printing operation. The master clock 18 comprises a 288-KHz multivibrator connected to a gating circuit which produces two 144-KHz clock signals, which are 180° out of phase with each other. One of these clocks is divided, with a seven-stage position counter. Each stage produces another clock, which is double the period of the preceding stage.

PARITY BIT GENERATION

Figure 10C:
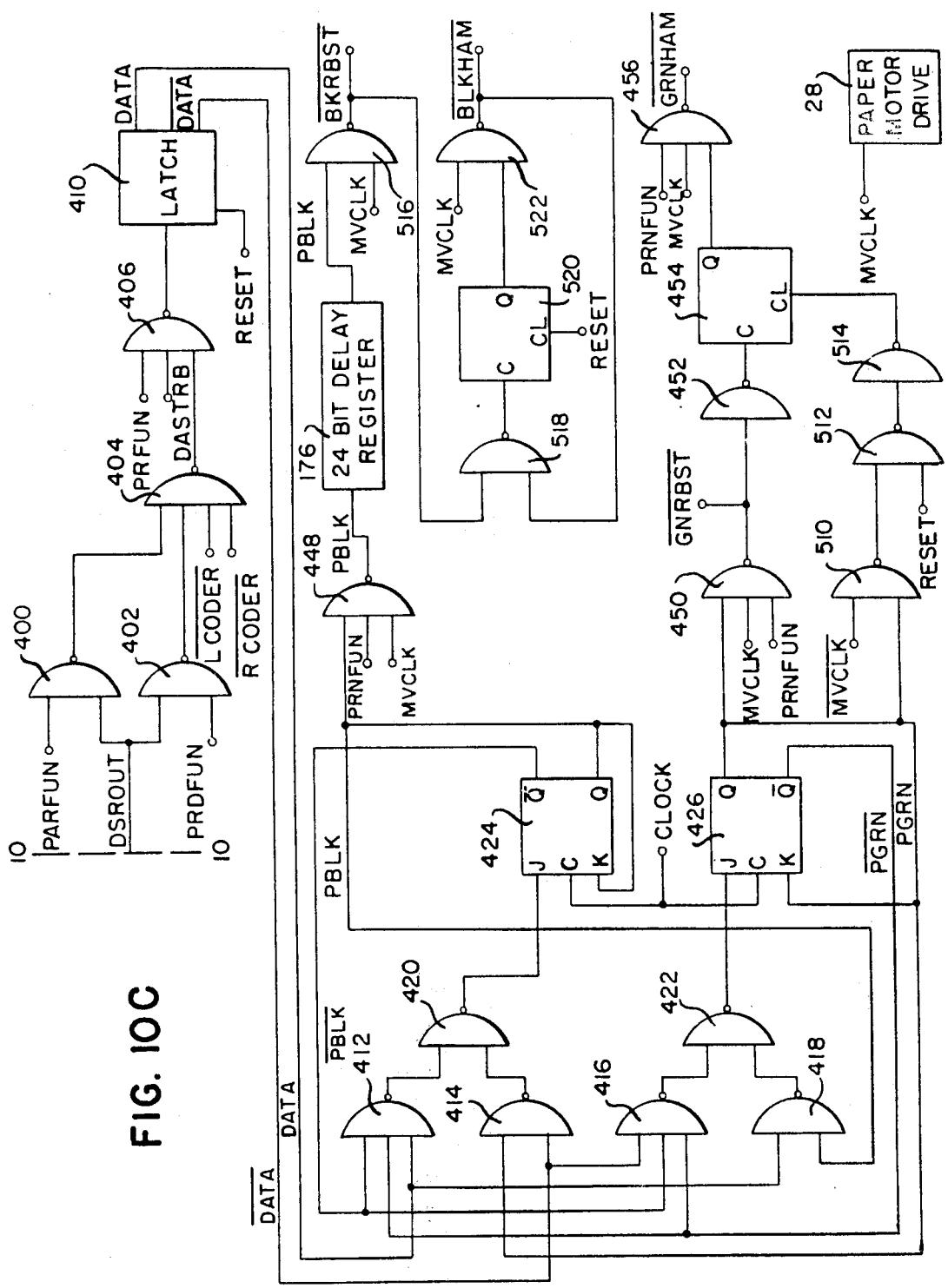
FIG. 10C illustrates in detail the logic circuitry for the binary-to-bar code converter.

It is necessary to generate two parity bits, prior to the time that any actual printing is accomplished, which insures that the MOD-3 sum of the "1" bits equals the MOD-3 sum of the "0" bits, dictating that the last color to be printed on the label is black. Parity bit generation occurs during the true PRFUN signal generating state, or, more specifically, during the PARFUN signal generating state, which occurs during a portion of the PRFUN signal generating state. When the PARFUN signal is true, all the data stored in the recirculating shift register 164 is sensed and operated on by the BBC converter 168 (FIG. 10C). The BBC converter 168 will subsequently be described in greater detail.

The final states at which the flip-flops 424 and 426 (FIG. 10C) remain determine the parity bits which are transmitted to the left and right end code registers 170a an 170b; specifically, to the flip-flops 444 and 446 (FIG. 12B). Referring to FIG. 12A, it can be seen that the Q output signals, labeled as PBLK and PGRN of the flip-flops 424 and 426, respectively, are coupled to a gating network composed of NAND gates 430, 432, and 434. The signal PBLK of the flip-flop 424 is coupled to one input of the NAND gate 430, while the $\overline{Q}$ output of the flip-flop 424, labeled $\overline{PBLK}$, is coupled to one input of the NAND gate 434. The signal PGRN of the flip-flop 426 is coupled to one input of the NAND gate 434, while the $\overline{Q}$ output of the flip-flop 426, labeled $\overline{PGRN}$, is coupled to one input of the NAND gate 434. The output of the NAND gate 430 is coupled to one of the inputs of the NAND gate 436 and is further coupled to the P terminal of the flip-flop 446. The output of the NAND gate 432 is coupled to one of the two inputs of the NAND gate 438 and is further coupled to the Cl terminal of the flip-flop 444. The output of the NAND gate 434 is coupled to one input of the NAND gate 438 having an output which is inverted by the NAND gate 442 and thereafter applied to the Cl terminal of the flip-flop 446. The output of the NAND gate 434 is also connected to one input of the NAND gate 436 having an output which is inverted by the NAND gate 440 and applied to the P terminal of the flip-flop 444.

It can be seen from FIG. 12B that the flip-flops 444 and 446 will both be set to a "0" (false) condition provided that the signals PGRN and $\overline{\text{PBLK}}$ are true, or will both be set to a "1" condition provided that both signals $\overline{\text{PGRN}}$ and PBLK are true. In the event that both signals PBLK and PGRN are false, the flip-flop 446 will be cleared to a "0" state, and the flip-flop 444 will be set to a "1" state.

Assume signal PARLD to be true, as it must be in order to condition the NAND gates 430, 432, and 434, and also assume the signal PBLK to be false and the signal PGRN to be true. Under these assumed conditions, the output of the NAND gate 430 will be true because of the false PBLK signal and the true PARLD signal coupled to the two input terminals thereof. The true output signal from the NAND gate 430 is applied to the P terminal of the flip-flop 446 and is also applied to one of the two input terminals of the NAND gate 436. The output of the NAND gate 432 is false because of the true PGRN and PARLD signals coupled to the two input terminals thereof, the output of which is applied to the Cl terminal of the flip-flop 444 and is also applied to one of the two inputs of the NAND gate 438. The output of the NAND gate 434 is true because of the false $\overline{\text{PGRN}}$ signal and the true $\overline{\text{PBLK}}$ signal coupled to the two input terminals thereof, the output of which is true and is coupled to the NAND gate 436 and to the second input of the NAND gate 438. The output of the NAND gate 436 is false because of the two true signals applied to the two input terminals thereof from the NAND gates 430 and 434. The false output signal from the NAND gate 436 is inverted into a true signal by the NAND gate 440 and applied to the P terminal of the flip-flop 444. The output of the NAND gate 438 is true because of the false input signal transmitted from the NAND gate 432 and the true output signal transmitted from the NAND gate 434. The true signal from the NAND gate 438 is inverted by the NAND gate 442 and transmitted to the Cl terminal of the flip-flop 446. Thus the flip-flops 444 and 446 will both be set to a "0" state because of the false signals applied to the Cl terminals of both the flip-flops 444 and 446. The two bits generated in the operation just cited are stored in the flip-flops 444 and 446 as "0" bits and therefore become a part of the data which will be printed on each tag.

BINARY-TO-BAR CODE CONVERTER

Figure 9:
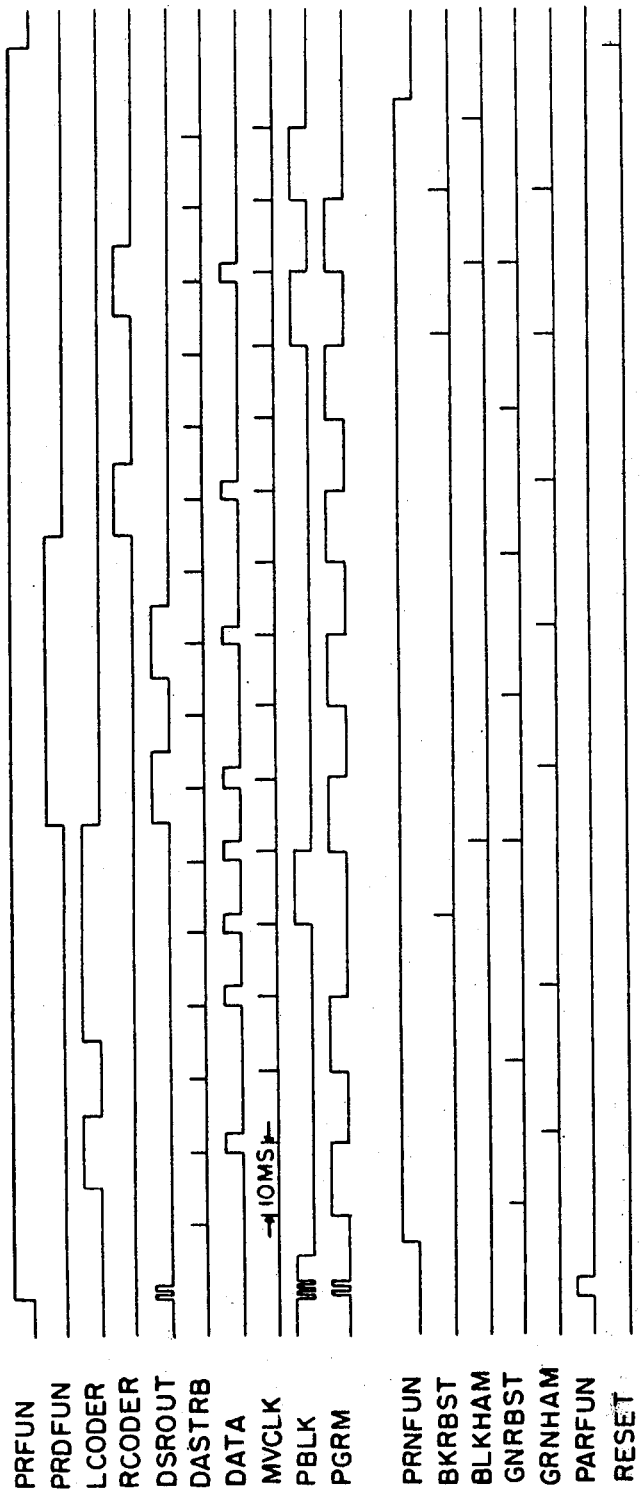
FIG. 9 is a timing chart for data printing.

The data from the recirculating shift register 164 is transmitted to the binary-to-bar code converter 168, illustrated in FIG. 10C, which is a code conversion device which converts the data into a code which is ultimately manifested in the eyes of a viewer in the form of colored bars printed on a record medium. The output signal from the shift register 164 is labeled DSROUT and is transmitted to one input of each of the NAND gates 400 and 402. A signal designated as PRDFUN forms the second input for the NAND gate 402, and a signal designated as PARFUN forms the second input for the NAND gate 400. The signals PARFUN and PRDFUN (FIG. 9) are control clock signals which may be generated by conventional clocking techniques. The signal PARFUN is true only when the control logic is conditioned to generate the parity bits, which was described previously, and PRDFUN is true only when the control logic is conditioned to print the data. Since the binary-to-bar code converter 168 is utilized during both parity generation and printing, it will suffice to describe only the operation thereof during the print cycle; that is, during the time the signal PRDFUN is true.

The NAND gate 402 is conditioned by the true signal PRDFUN to sense and transmit all the data stored in the shift register 164. This data is transmitted to one of the four input terminals of the NAND gate 404, the output of which is applied to one of the three input terminals of the NAND gate 406. The remaining three input terminals of the NAND gate 404 are formed by the output of the NAND gate 400, which is true because signal PARFUN is false, and the two signals labeled $\overline{\text{LGODER}}$ and $\overline{\text{RCODER}}$, which are true output signals transmitted by the inverted direction bits of the left and right end code registers 170a and 170b. Therefore, under these conditions, DSROUT will be transmitted to the output of the NAND gate 404. The remaining two input terminals of the NAND gate 406 are formed by the signal PRFUN and the signal DASTRB, which is a signal generated for strobing the data at definite time intervals, so that, when DASTRB is true, the data is sensed by the NAND gate 406, which transmits the output DSROUT from the NAND gate 404 to the input of a latch circuit 410. The latch circuit 410 generates a pair of output signals labeled DATA and $\overline{\text{DATA}}$. If the signal DSROUT is a "1" or a true bit, the signal DATA will be true. Of course, with DATA true, $\overline{\text{DATA}}$ will be false. If DSROUT is false, DATA will be false, and $\overline{\text{DATA}}$ will be true.

The signals DATA and $\overline{\text{DATA}}$ are transmitted to the binary-to-bar code converter 168, comprising first and second gating networks. The first gating network is made of NAND gates 416 and 418, the outputs of which are coupled to the two input terminals of a NAND gate 422, the output thereof being coupled to the J terminal of the flip-flop 426. The second network is formed by NAND gates 412 and 414, the outputs of which are coupled to the two inputs of a NAND gate 420. The output of the NAND gate 420 is coupled to the J terminal of the flip-flop 424. The Q output of the flip-flop 424, referred to previously as signal PBLK, is coupled to the K terminal of the "black" flip-flop 424 and is further coupled to one of the inputs of the NAND gate 418 and to one of the inputs of a NAND gate 448. The $\overline{\text{Q}}$ output of the flip-flop 424, referred to previously as signal $\overline{\text{PBLK}}$, is connected to one input terminal of each of the NAND gates 412 and 416. The Q output of the flip-flop 426, referred to previously as signal PGRN, is coupled to the K terminal of the "green" flip-flop 426 and is further coupled to one input of each of the NAND gates 414, 450, and 510. The $\overline{\text{Q}}$ output of the flip-flop 426, referred to previously as signal $\overline{\text{PGRN}}$, is connected to one input of each of the NAND gates 412 and 416.

The output signal produced by the NAND gate 420, which forms the input signal for the J input of the "black" flip-flop 424, can best be described by the following Boolean expression:

$\overline{\text{PBLK}}\ \overline{\text{PGRN}}\ \text{DATA} + \text{PGRN}\ \overline{\text{DATA}}.$ The output signal produced by the NAND gate 422, which forms the input signal for the J terminal of the flip-flop of the "green" flip-flop 426, can best be described by the following Boolean expression:

PBLK DATA + $\overline{\text{PBLK}}$ $\overline{\text{PGRN}}$ $\overline{\text{DATA}}$.

It can be seen from the above Boolean expressions that the output signals of the NAND gates 420 and 422 can never both be true at the same time. This, coupled with the fact that the K terminal of each of the flip-flops 424 and 426 is coupled to its own respective Q terminal, dictates that the state of either flip-flop 424 and the flip-flip 426 cannot be consecutively repeated.

The signals DATA and $\overline{\text{DATA}}$ are generated with each DASTRB pulse, which results in one bit stored in the shift register 164 being sensed and transmitted to the latch circuit 410 for conversion into either a DATA or a $\overline{\text{DATA}}$ signal.

The operation of the binary-to-bar code converter 168 can be more readily understood with the aid of a timing diagram illustrated in FIG. 11. The operation of the circuit is graphically illustrated for six data bits, which will now be described with reference to FIGS. 10C and 11. It is necessary to assume that the flip-flops 424 and 426 are in a reset condition, which is always the case, prior to initially operating the BBC converter 168, The following situation exists prior to the application of the clock pulse 1. Coupled to the three input terminals of the NAND gate 412 are a true signal $\overline{\text{PBLK}}$, a true signal $\overline{\text{PGRN}}$, and a false signal DATA. Therefore, since one of the inputs is a false signal, the output of the NAND gate 412 will be a true signal which is applied to one of the two input terminals of the NAND gate 420. The two input terminals of the NAND gate 414 are coupled to a false signal PGRN and a true signal $\overline{\text{DATA}}$. Therefore, since one of the input signals to the NAND gate 414 is false, the output of the NAND gate 414 will be true and is applied to the remainder of the input terminals of the NAND gate 420. The output of the NAND gate 420 is false because of the true signals applied to the two input terminals thereof from the NAND gates 412 and 414. The false output signal from the NAND gate 420 is applied to the J terminal of the "black" flip-flop 424. Coupled to the three input terminals of the NAND gate 416 are signals $\overline{\text{DATA}}$, $\overline{\text{PBLK}}$, and $\overline{\text{PGRN}}$, which at this point in time are all true signals; therefore, the output of the NAND gate 416 is false and is coupled to one of the two inputs of the NAND gate 422. The NAND gate 418 is coupled to two input signals, which at this time are both false; i.e., signals DATA and PBLK. Therefore, the output of 418 is a true signal, which is coupled to the remaining input terminal of the NAND gate 422. A true output signal is experienced at the NAND gate 422 because of the false input signal applied to the NAND gate 422 by the NAND gate 416. The true output signal of the NAND gate 422 is applied to the J terminal of the "green" flip-flop 426. Upon the fall of clock pulse 1, the "green" flip-flop 426 will be toggled into a true state, therefore rendering the Q output, signal PGRN, true and the $\overline{\text{Q}}$ output, signal $\overline{\text{PGRN}}$, false. The true signal PGRN, because of the true Q output of the flip-flop 426, will result in the recording of a green bar 92a. This will be elaborated on later in the disclosure. The black flip-flip 424 remains in a false state because its J terminal is coupled to a false output signal from the NAND gate 420, which prevents the flip-flop 424 from toggling to a true state at the fall of clock pulse 1.

The signal PGRN, now true, is transmitted to the K terminal of the green flip-flop 426, to one of the inputs of the NAND gate 414, and to one of the inputs of a NAND gate 450. The $\overline{\text{PGRN}}$ output of the green flip-flop 426, now false, is transmitted to the one of the three input terminals of the NAND gate 416, one of the two inputs of the NAND gates 414 and 510. The now false signal $\overline{\text{PGRN}}$ and the still yet false DATA signal result in the output of the NAND gate 412 remaining true, the output of the NAND gate 414 going false, the output of the NAND 416 going true, and the output of the NAND gate 418 remaining true. These signals are illustrated in FIG. 11. Therefore, the output of the NAND gate 420 is rendered true and is applied to the J terminal of the "black" flip-flop 424. The output of the NAND gate 422 is rendered false and is applied to the J terminal of the "green" flip-flop 426. Nothing occurs until the fall of clock pulse 2, at which time the "black" flip-flop 424 is toggled into a true state and the "green" flip-flop 426 is reset to a false state because of the true $\overline{\text{PGRN}}$ signal applied to the K reset terminal of the "green" flip-flop 426. Therefore, the Q output PBLK of the "black" flip-flop 424 is rendered true, and the $\overline{\text{Q}}$ output $\overline{\text{PBLK}}$ is rendered false. These signals effect changes in the outputs of the NAND gates 412, 414, 416, and 418, which can be seen in FIG. 11. The now true signal PBLK is utilized in effecting the printing of a black bar 92b on the record medium 30, a fact which will be elaborated on later in this disclosure. The third DSROUT bit illustrated in FIG. 13 is still a zero; therefore the signal DATA remains false, and the signal $\overline{\text{DATA}}$ remains true.

Referring again to FIG. 11, it can be seen that, after the fall of clock pulse 2, the output of the NAND gate 412 is true, the output of the NAND gate 414 is true, the output of the NAND gate 416 is true, and the output of the NAND gate 418 is true. These signals render the output of the NAND gate 420 false and the output of 422 false, respectively. Therefore, the J terminals of both flip-flops 424 and 426 are coupled to false signals. However, the K terminal of the "black" flip-flop 424 is coupled to the now true PBLK signal. Thus it can be seen that, at the fall of clock pulse 3, the black flip-flop 424 will be reset to a false condition, and the green flip-flop 426 will remain in a false condition. The fact that both flip-flops 424 and 426 are in a false condition dictates that neither a black bar nor a green bar will be printed on the record medium 30. This results in a surface equivalent to the area of a colored bar on the record medium 30 not receiving the black or green color, therefore leaving that surface white, which is utilized as the third indicium.

The operation of the binary-to-bar code converter 168 has been described with reference to the entry of three zero bits. The analysis is similar for the entry of any combination of either zero or one bits. It can be seen, because of the electrical configuration utilized here, that the flip-flops 424 and 426 cannot remain in one state for two consecutive pulses. Therefore, no two adjacent bars on the record medium 30 will be of identical colors, which results in the transition required by the transition code utilized herein.

PRINTING

The PGRN signal from the green flip-flop 426 is coupled to one of the three inputs of the NAND gate 450. The output of the NAND gate 450 is coupled to the one input of a NAND gate 452, whose output is coupled to the clock terminal of a flip-flop 454. The Q output of the flip-flop 454 is applied to one of the terminals of a NAND gate 456. The other two terminals of the NAND gate 456 are formed by signals PRNFUN and MVCLK. The signal PGRN is also connected to one of the two inputs of a NAND gate 510, the other input being formed by the signal MVCLK. The output of the NAND gate 510 is applied to one of two inputs of a NAND gate 512, whose remaining input is formed by the signal RESET. The output of the NAND gate 512 is inverted by a NAND gate 514, the output of which is coupled to the Cl terminal of the flip-flop 454.

The Q output of the flip-flop 454 is coupled to one of the three inputs of a NAND gate 456, the remaining two inputs being coupled to signals PRNFUN and MVCLK, respectively. The output signal of the NAND gate 456 is designated as $\overline{GRNHAM}$.

The Q output from the flip-flop 424, labeled PBLK, is applied to one of the inputs of the NAND gate 448, the other two inputs being coupled to signals PRNFUN and MVCLK, respectively. The output of the NAND gate 448 is coupled to the input of the 24-bit delay register 176 in order to account for the twenty-four bar spaces between the print hammers 44 and 64. The delay register 176 may be a conventional flip-flop shift register. The output of the 24-bit delay register 176 is coupled to one of the inputs of a NAND gate 516, the other input of which is coupled to signal MVCLK. The output signal of the NAND gate 516, labeled $\overline{BKRBST}$, is applied to one of the inputs of a NAND gate 518. The output of the NAND gate 518 is coupled to the Cl terminal of a flip-flop 520. The Cl terminal of the flip-flop 520 is coupled to a RESET signal. The Q output of the flip-flop 520 is coupled to one of the two inputs to the NAND gate 522, the other input being coupled to the signal MVCLK.

The output of the NAND gate 522 is labeled $\overline{BLKHAM}$ and is coupled to the remaining input of the NAND gate 518. The signals $\overline{BKRBST}$ and $\overline{GNRBST}$ are the control signals which increment the black and green ribbons, respectively. The signals $\overline{GRNHAM}$ and $\overline{BLKHAM}$ are the control signals which actuate the green and black hammers, respectively.

Also shown in FIG. 10C is a paper motor drive 28, which may be a conventional stepping motor, and which is controlled by the signal MVCLK. The paper motor drive 28 incrementally moves the record medium with every true MVCLK signal.

The PGRN signal from the "green" flip-flop 426 (FIG. 10C) is transmitted by the NAND gate 450 when both signals MVCLK and PRNFUN are true. The signal output of the NAND gate 450, designated as $\overline{BRNBST}$, is transmitted to the green ribbon drive motor 72, which incrementally moves the fresh source of green ribbon 36 between the print hammer 44 and the print bar 40. The signal $\overline{GRNBST}$ is also inverted by the NAND gate 452 and transmitted to the clock terminal of the flip-flop 454, thus toggling the flip-flop 454 into a true state. The true Q output of the flip-flop 454 is transmitted to the NAND gate 456, the output thereof actuating the green hammer 44, thus effecting the printing of a green indicium on the record medium 30. The paper motor drive 28 also incrementally moves the paper a bar width on the application of the MVCLK signal.

Similarly, the PBLK signal, when true, is transmitted by the NAND gate 448 to the 24-bit delay register 176. Twenty-four bit times later, at which time the printing space which is to receive the black stripe is positioned beneath the black print hammer 64, PBLK will be transmitted to the NAND gate 516, the output thereof, labeled $\overline{BKRBST}$, actuating the black ribbon drive motor 74. The application of the $\overline{BKRBST}$ signal results in the placing of a fresh portion of black ribbon between the print bar 60 and the print hammer 64. The signal $\overline{BKRBST}$ is further transmitted by the NAND gate 518 to the clock terminal of the flip-flop 520, thus toggling the flip-flop 520 into a true state. The true Q output of the flip-flop 520 is applied to the NAND gate 522, which generates an output during the time that the signals $\overline{BLKHAM}$ and MVCLK are both true. The signal $\overline{BLKHAM}$ is a control signal which activates the black print hammer 64, thus effecting the printing of a black indicium on the record medium 30.

The sequence in which the data is printed is as follows. The information located in the left end code register 170a (FIG. 12B) is transmitted to the binary-to-bar code converter 168 and converted into control signals for actuating the printing mechanism of the printer when PRLFUN is true in conjunction with the true clock signal MVCLK. After the left end code register 170a is unloaded, the information stored in the shift register 164 is sensed by the NAND gate 402 and transmitted to the binary-to-bar code converter 168 for conversion into control signals for actuating the printing mechanism. On completion of this operation, the information in the right end code register 170b is also converted into control signals when PRRFUN is true in conjunction with the true clock signal MVCLK. On the completion of a printed tag, the tag counter 156 is decremented one digit. If there are more tags to be printed, the printing process is repeated.

LEFT AND RIGHT END CODE REGISTERS

Referring to FIG. 12B, there are illustrated the left end register 170a and the right end code register 170b. The left end code register 170a is composed of six flip-flops 460, 462, 464, 466, 468, and 444. The flip-flop 460 contains the left direction bit, which, in this embodiment, is always zero. Therefore the flip-flop 460 is initially set in its false state. The flip-flops 462, 464, 466, and 468 contain data which determines the size of the label 90. This data is transmitted to the end code registers 170a and 170b from the size counter 152, in parallel, to the aforementioned flip-flops. The transmitted signals from the size counter 152 are labeled as signals SCB-2, SCB-4, SCB-8, and SCB-16.

The depression of the function switch 158 results in the generation of a signal labeled PARFUN. When PARFUN goes true, it conditions the NAND gates 472, 474, 476, 478, 480, 482, 484, and 490 to transmit the output of the size counter 152 to the flip-flops corresponding to the above-enumerated NAND gates. The flip-flops 444 and 446, as was previously discussed, are utilized to store the parity bit information. The signal PRLFUN is generated in order to shift the information out of the left end code register 170a with the signal MVCLK at a time when it is ready to be printed. The output of the left end code register 170a, or, more specifically, at the output of the flip-flop 460, is labeled LCODER and is applied to the NAND gate 404 (FIG. 10C). Similarly, the right end code register 170b is loaded with information from the size counter 152. When the printing logic is ready to receive and print the data located in the right end code register, a signal PRRFUN is generated in order that the signal MVCLK may shift the information out of the right end code register 170b, or, more specifically, at the output of the flip-flop 446. The output of the flip-flop 446 is labeled RCODER and is also transmitted to the NAND gate 404 (FIG. 10C).

MOVE GENERATOR

The move generator, not shown, is a clock which produces the MVCLK signals during the time that PRFUN signal is true. This pulse performs the synchronizing function for controlling the stepping of the ribbon drive motors 72 and 74 and also controls the paper transport drive 28. As each MVCLK signal is generated, the paper advances one step or increment which is equal to one printed bar width, which occurs when the signals PGRN and PBLK are both false, therefore effecting the recording of a white indicium.

What is claimed is:

1. A code converting logic circuit for converting a binary signal manifesting a series of logic "1" and logic "0" bits to a transition code manifested by at least two signals having at least three different coding arrangements, a given order of said coding arrangements being defined, transitions from one coding arrangement to another coding arrangement in said defined order representing a logic "1" bit and transitions from one coding arrangement to another coding arrangement in an order opposite to said defined order representing a logic "0" bit, said code converting logic circuit comprising:

gating means for providing first and second output signals in response to said binary signal;

first bistable means having a first input terminal and set and reset output terminals, said first input terminal being coupled to said gating means whereby said first bistable means is capable of being changed from a set to a reset state in response to said first output signal; and second bistable means having a first input terminal and set and reset output terminals, said first input terminal being coupled to said gating means whereby said second bistable means is capable of being changed from a set state to a reset state in response to said second output signal;

said set and reset output terminals of said first and second bistable means being coupled to input terminals of said gating means whereby said first output signal occurs when said binary signal manifests a logic "1" bit and both of said first and second bistable means are in said reset state, said first output signal occurs when said binary signal manifests a logic "0" bit and said second bistable means is in said set state, said second output signal occurs when said binary signal manifests a logic "0" bit and said first and second bistable means are in said reset state, and said second output signal occurs when said binary signal manifests a logic "0" bit and said first bistable means is in said set state.

2. The invention according to claim 1:

wherein said code converting logic circuit further includes means for providing a series of periodic timing signals;

wherein said first and second bistable means each have a clock input terminal; and wherein said means for providing a series of timing signals is coupled to said clock input terminal of each of said first and second bistable means whereby said first bistable means is changed to said set state upon the coincident occurrence of said first signal and a timing signal and is changed back to said reset state by a subsequent occurring timing signal; and wherein said second bistable means is changed to said set state upon the coincident occurrence of said second signal and a timing signal and is changed back to said reset state by a subsequent occurring timing signal.

3. The invention according to claim 2 wherein said subsequent occurring timing signal occurs no later than the time a timing signal is provided to cause one of said bistable means to change to said set state.

4. The invention according to claim 3:

wherein each of said first and second bistable means provides a set and a reset signal at said set and reset output terminals respectively, said set signal manifesting a logic "1" bit when each of said first and second bistable means is in said set state and a logic "0" bit when each of said bistable means is in said reset state and said reset signal manifesting a logic "1" bit when each of said bistable means is in said reset state and a logic "0" bit when each of said bistable means is in said set state; and wherein said gating means is responsive to said set and reset output signals from said first and second bistable means.

5. The invention according to claim 4:

wherein said code converting logic circuit further includes means responsive to said binary signal, coupled to said gating means for providing DATA and $\overline{\text{DATA}}$ signals, on separate DATA and $\overline{\text{DATA}}$ output terminals thereof, said DATA signal manifesting the same logical values manifested by said binary signal and said DATA signal manifesting the compliment of said $\overline{\text{DATA}}$ signal; and wherein said gating means includes first, second, third and fourth gates respectively providing first, second, third and fourth output gate signals, said first gate being coupled to said DATA output terminal, and to said reset output terminals of said first and second bistable means, said second gate being coupled to said $\overline{\text{DATA}}$ output terminal, and to said set output terminal of said second bistable means, said third gate being coupled to said $\overline{\text{DATA}}$ output terminal, and to said reset output terminals of said first and second bistable means and said fourth gate being coupled to said DATA output terminal, and to said set output terminal of said first bistable means, said first, second, third and fourth output gate signals being provided respectively whenever all of the input signals applied to a respective one of said first, second, third and fourth gates all manifest a logic "1" bit.

6. The invention according to claim 5 wherein said first signal provided by said gating means is provided whenever either of said first or said second gate signals is provided and said second signal provided by said gating means is provided whenever either of said third and fourth gate signals are provided.

* * * * *